(12) United States Patent
Sonne et al.

(10) Patent No.: US 8,195,522 B1
(45) Date of Patent: Jun. 5, 2012

(54) ASSESSING USERS WHO PROVIDE CONTENT

(75) Inventors: Samuel S. Sonne, Seattle, WA (US); Pranav Dandekar, Seattle, WA (US); James G. Robinson, Olympia, WA (US); Anne R. Marshall, Seattle, WA (US); Sameer R. Rajyaguru, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 435 days.

(21) Appl. No.: 12/165,490

(22) Filed: Jun. 30, 2008

(51) Int. Cl.
*G06Q 30/00* (2012.01)

(52) U.S. Cl. .................................................. 705/26.2

(58) Field of Classification Search .................. None
See application file for complete search history.

(56) References Cited

U.S. PATENT DOCUMENTS

| | | | |
|---|---|---|---|
| 6,263,447 | B1 | 7/2001 | French et al. .................. 713/201 |
| 7,363,214 | B2* | 4/2008 | Musgrove et al. ................ 704/9 |
| 2002/0004772 | A1 | 1/2002 | Templeton et al. ............. 705/35 |
| 2006/0282336 | A1* | 12/2006 | Huang ............................ 705/26 |
| 2007/0118802 | A1* | 5/2007 | Gerace et al. .................. 715/738 |
| 2009/0192808 | A1* | 7/2009 | Sela .................................. 705/1 |

OTHER PUBLICATIONS

"About Epinions," Epinions.com, retrieved Aug. 4, 2003, from http://www.epinions.com/about/, 2 pages.

"Advisor Role Transition Q&A," Epinions.com, retrieved Aug. 4, 2003, from http://www.epinions.com/help/faq/show_~faq_transition, 4 pages.

"Category Lead, Top Reviewer and Advisor FAQ," Epinions.com, retrieved Aug. 4, 2003. from http://www.epinions.com/help/faq/show_~faq_recognition, 12 pages.

"Company Overview," eBay, retrieved Aug. 4, 2003, from http://pages.ebay.com/community/aboutebay/overview/index.html, 2 pages.

"Company Overview—Trust, Safety and Privacy," eBay, retrieved Aug. 4, 2003, from http://pages.ebay.com/community/aboutebay/overview/trust.html, 2 pages.

"Explanation of the Web of Trust of PGP," Feb. 2004, retrieved Nov. 10, 2004, from http://www.rubin.ch/pgp/weboftrust.en.html, 3 pages.

"FAQ's—The Web of Trust," Epinions.com, retrieved on Nov. 10, 2004, from http://www.epinions.com/help/faq/?show=faq_wot, 4 pages.

(Continued)

*Primary Examiner* — Paul Danneman
(74) *Attorney, Agent, or Firm* — Seed IP Law Group PLLC

(57) ABSTRACT

Techniques are described for assessing users who provide content, such as based on the provided content and/or on aspects of how/when the content is provided. In at least some situations, the users being assessed are author users who create some or all of the content that they provide, while in other situations users may provide other types of content (e.g., content that is identified and/or selected by the users, but not created by the users). Assessment of the content-providing users may be performed in various manners, such as to generate one or more user contribution scores or other user contribution ratings for some or all such users, such as to reflect a combination of multiple factors (e.g., a quantity of pieces of content provided by a user, a recency of providing some or all of the content pieces, an assessed quality of the provided content pieces, etc.).

25 Claims, 9 Drawing Sheets

OTHER PUBLICATIONS

"Frequently Asked Questions About Reviewers," Amazon.com, retrieved Jul. 31, 2003, from http://www.amazon.com/exec/obidos/subst/community/reviewers-faq.html/ref=cm_tr_trl_faq/104-1986906-044793, 3 pages.

"Frequently Asked Questions," TrueDater.com, retrieved Apr. 4, 2005, from http://www.truedater.com/index.php?action=faqs, 2 pages.

"Mission Statement" and "Advogato's Trust Metric" Advogato, retrieved Aug. 4, 2003, from http://www.advogato.com/trust-metric.html, 6 pages.

U.S. Appl. No. 10/646,341, filed Aug. 22, 2003, Marsh et al.

U.S. Appl. No. 11/290,623, filed Nov. 30, 2005, Vander Mey et al.

"Opinity Launches First Online Reputation Service for Internet Users," Apr. 18, 2005, Opinity.com, retrieved Jan. 5, 2006, from http://www.opinity.com/press/service_release_final.php, 2 pages.

"Papers on Reputation," retrieved Aug. 4, 2003, from http://databases.si.umich.edu/reputations/bib/bibM.cfm, 7 pages.

"Payment-On-Line (AOL, Compuserve, Internet, etc)," Oct. 20, 1994, Google Groups, retrieved Dec. 6, 2004, from http://groups-beta.google.com/group/misc.entrepreneurs/browse_thread/thread/80fcf110252bb3f7/ff1c8, 3 pages.

"Rank Reviewer," Amazon.com, retrieved Aug. 4, 2003, from http://www.amazon.com/exec/obidos/tg/cm/top-reviewers-list/-/1/ref=cm_tr_trl_top/104-1986906-0447936, 4 pages.

"Rating Reviews on Epinions.com," Epinions.com, retrieved Aug. 4, 2003, from http://www.epinions.com/help/faq/show_~faq_rating, 2 pages.

"Reputation—eBay Feedback: Overview," eBay, retrieved Aug. 4, 2003, from http://pages.ebay.com/help/confidence/reputation-ov.html, 1 page.

"Root/News," Root.net, retrieved Dec. 20, 2005, from http://www.root.net/about/news, 3 pages.

"Stars—Earning Your Stars Through Positive Feedback," eBay, retrieved Aug. 4, 2003, from http://pages.ebay.com/help/confidence/reputation-stars.html, 1 page.

"Test-Earnings on Epinions.com," Epinions.com, retrieved Aug. 4, 2003, from http://www.epinions.com/help/faq/show_~faq_earnings, 4 pages.

"The Web of Trust," Epinions.com, retrieved Aug. 4, 2003, from http://www.epinions.com/help/faq/?show=faq_wot, 4 pages.

"Web of Trust," Thawte.com, retrieved Nov. 10, 2004, from http://www.thawte.com/wot/, 1 page.

"Welcome to the Reputation Research Network," retrieved Aug. 4, 2003, from http://databases.si.umich.edu/reputations/indexM.cfm, 1 page.

Bellare, M., et al., "Security Proofs for Identity-Based Identification and Signature Schemes," May 2004, retrieved Oct. 12, 2004, from http://eprint.iacr.org/2004/252.pdf, pp. 1-53, 53 pages.

Boyen, X., "Multipurpose Identity-Based Signcryption—A Swiss Army Knife for Identity-Based Cryptography," retrieved Oct. 12, 2004, from http://eprint.iacr.org/2003/163.pdf, pp. 1-34, 34 pages.

Donath, J., "Identity and Deception in the Virtual Community," Nov. 12, 1996, retrieved Nov. 10, 2004, from http://smg.media.mit.edu/people/Judith/Identity/IdentityDeception.html, 26 pages.

Hallberg, G., "Who is Grady Harp?" Jan. 22, 2008, retrieved Jun. 27, 2008, from http://www.slate.com/toolbar.aspx?action=print&id=2182002, 3 pages.

Kollock, P., "The Production of Trust in Online Markets," 1999, retrieved Nov. 10, 2004, from http://www.sscnet.ucla.edu/soc/faculty/kollock/papers/online_trust.htm, 18 pages.

Lynn, R., "Keeping Online Daters Honest," Apr. 1, 2005, Wired News, retrieved Apr. 4, 2005 from http://www.wired.com/news/print/0,1294,67083,00.html, 3 pages.

OSDN, Slashdot, retrieved Aug. 4, 2003, from http://slashdot.org/faq/com-mod.shtml, 21 pages.

OSDN, Slashdot, retrieved Aug. 4, 2003, from http://slashdot.org/faq/metamod.shtml, 4 pages.

Spiegel, D. "Identity Deception," Feb. 15, 2000, retrieved Nov. 10, 2004, from http://xenia.media.mit.edu/~spiegel/classes/VirtualSociety2000/Deception.html, 2 pages.

Thompson, N., "More Companies Pay Heed to Their 'Word of Mouse' Reputation," Jun. 23, 2003, TheNewYorkTimes.com, retrieved Jun. 23, 2003, from http://www.nytimes.com/2003/06/23/technology/23REPU.html?adx..., 3 pages.

Wang, G., et al., "Remarks on Saeednia's Identity-Based Society Oriented Signature Scheme with Anonymous Signers," retrieved on Oct. 12, 2004, from http://eprint.iacr.org/2003/046.pdf, 6 pages.

* cited by examiner

Fig. 2

Already Own It?
Rate It!

To improve your
recommendations,
rate this product:

⦿ Not Rated
○ ★☆☆☆☆
○ ★★☆☆☆
○ ★★★☆☆
○ ★★★★☆
○ ★★★★★

☐ I own it
( Rate it )

wonders of the Kremlin and Red Square; from the legendary Pushkin Theater to the dramatic site of the Odessa Steps immortalized in Eisenstein's classic film *The Battleship Potemkin*; from breathtaking views of the Black Sea to the calm of a sleeping city on a winter night; this is the world that inspired the eternal genius of Tchaikovsky. ⟵ 400

Was this content helpful to you? (YES) (NO) ⟵ 417

All Customer Reviews
Avg. Customer Rating: ★★★★☆
⟵ 421
Write an online review and share your thoughts with other shoppers!

⟵ 413  ⟵ 412   ⟵ 414   ⟵ 411
★★★★☆ /Still not quite perfect but very nice indeed, March 24, 2001
TOP 10 Reviewer: Reviewer C (see more about me)   from Keene, NH USA
Reviewer DVD International has added a new entry to its Naxos Musical Journey series: Tchaikovski's <Symphony No. 6 [and the] Eugene Onegin Ballet Music> (DVDI 1010). Using the Naxos recording with the Polish National Radio Symphony Orchestra (Antoni Wit) for the Symphony and the Czecho-Slovak Radio Symphony Orchestra (Ondrej Lenard) for the ballet, the visual format is a tour of locales in St. Petersburg, Moscow, Odessa, Ukraine, and the Crimea.

The first movement of the Symphony is exemplary in its coordination of natural settings with the mood and quick changes of mood in the orchestra: dark blue skies and waters for the Adagio, brighter scenes of mountains and lakes for the Allegro non troppo. The last movement (Adagio lamentoso-Andante) is treated with equal skill. However, the bouncy third movement (Allegro con grazia) suffers from a case of the cutes with people going up and down the famous Odessa steps in time to the music and other shots of people not at all in synch with the music. The second movement starts with a closeup of a frog and gets too much involved with people rather than scenes.

Both of the Onegin pieces suffer from the same desire to show milling throngs, although there are several moments in the Polonaise when music and picture get together in a very powerful way.

It would have been most helpful if DVDI gave us the locale on the printed notes, since it is awkward to bring up that information from the menu when you want to know where you are. Still in all, not a bad offering in this ambitious but still not perfect series.
410 ⟵
Was this review humorous? |No|A little|Moderately|A lot|A laugh riot| ⟶ 415  ⟵ 416
Was this review useful to you? |1|2|3|4|5| (5 is most useful, 1 is least useful)

*Fig. 4*

ASSESSING USERS WHO PROVIDE CONTENT

BACKGROUND

As the Internet and other online access to information continue to grow, users are increasingly presented with an overabundance of available information content without effective means to manage it (e.g., to identify content that is relevant, accurate and enjoyable), or to identify users who create content that has desired attributes. One particular example of an increasing source of content relates to merchants that make items (e.g., products, services, information, etc.) available to customers for purchase, rent, lease, license, trade, evaluation, sampling, subscription, etc., such as via the World Wide Web ("the Web"). Some Web merchants design their Web sites to display content in order to draw interest to items available from the Web site, such as item reviews and item pictures that are prepared by the operator of the Web site or the manufacturer/distributor of the item to provide additional information about an item. In addition, in some cases, volunteer users of a Web site, such as customers of a merchant's Web site, may prepare and supply at least some such content for use by other users.

BRIEF DESCRIPTION OF THE DRAWINGS

FIGS. 2-6 are display diagrams illustrating examples of displays for presenting and evaluating user-supplied content and for presenting information about top-ranked content-providing users.

DETAILED DESCRIPTION

Figure 1:
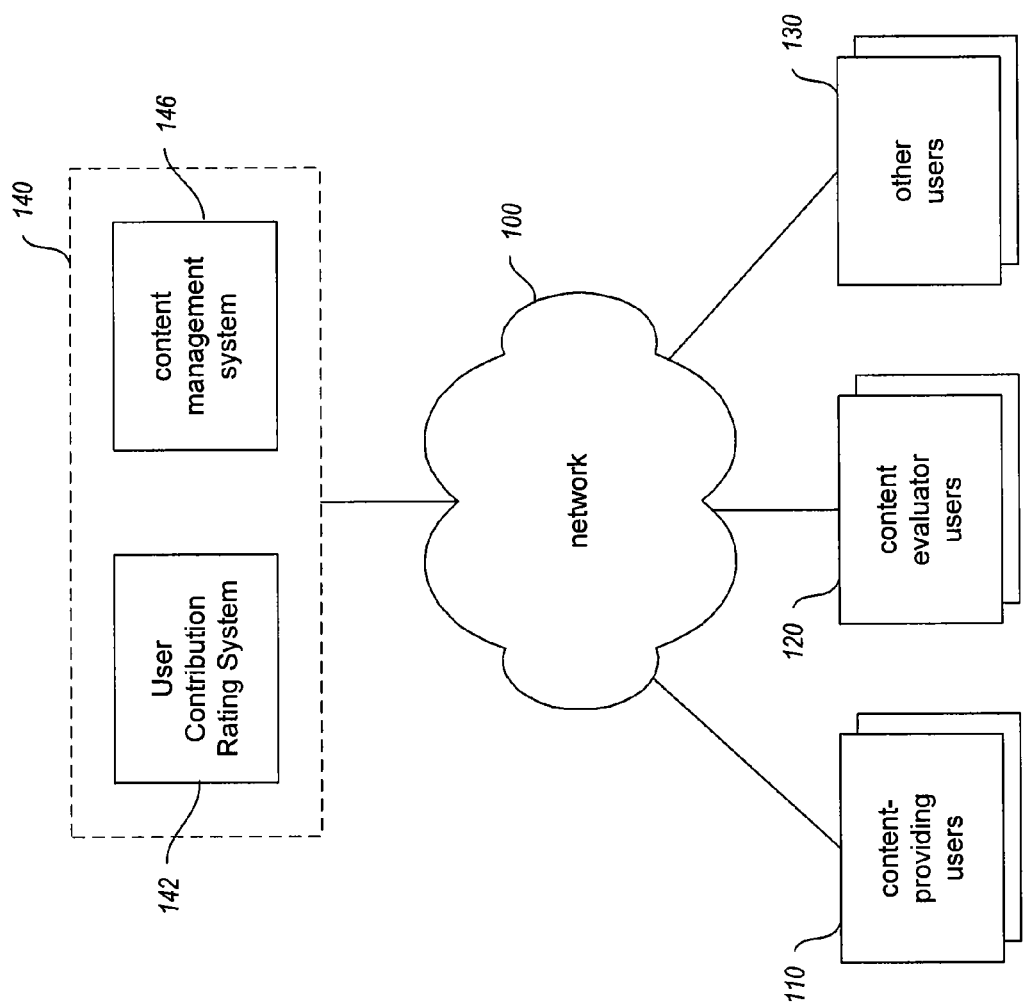
FIG. 1 is a network diagram illustrating an example embodiment of interactions to assess content-providing users.

Techniques are described for assessing users who provide content in various situations, such as by assessing users based on the provided content and/or on aspects of how and when the content is provided. In at least some embodiments, the users being assessed are author users who create some or all of the content that they provide, while in other embodiments and situations users may provide other types of content (e.g., content that is identified and/or selected by the users, but not created by the users). In addition, the content provided by the users may have various forms in various embodiments, as discussed in greater detail below, and may be used for various purposes.

The assessment of the author users and other content-providing users may be performed in various manners in various embodiments, such as to generate one or more user contribution scores or other user contribution ratings for some or all such users to reflect one or more attributes of interest regarding the provision of content by the users. As one example, in some embodiments, a user contribution rating for a content-providing user is generated to reflect a combination of multiple factors (e.g., a quantity of pieces of content provided by the user, a recency of providing some or all of the content pieces, an assessed quality of the provided content pieces, a regularity of providing content pieces, etc.), such as to reward users with higher contribution ratings as they increase one or more such factors. Additional details regarding the assessment of content-providing users are included below. In addition, in at least some embodiments, the described techniques are automatically performed by an automated User Contribution Rating system, as described in greater detail below.

Once user contribution ratings are generated for one or more content-providing users to reflect the prior providing of content by those users, such user contribution ratings may be used to provide various benefits in various manners. For example, in some embodiments, user contribution ratings for some or all such content-providing users may be publicly displayed or otherwise made available to those content-providing users and/or to other users, such as to recognize a subset of the content-providing users with the highest user contribution ratings (e.g., to enhance the reputation of the recognized content-providing users with other users, to acknowledge the valuable contributions of such recognized content-providing users, etc.). To the extent that the user contribution ratings are generated in such a manner as to reward desired behavioral characteristics of the content-providing users (e.g., providing high-quality content, providing high quantities of content, providing content recently and/or regularly, etc.), such recognition of some or all content-providing users may encourage those users and/or other users to perform additional desired behavior (e.g., to provide additional content in a desired manner). Furthermore, in at least some embodiments, the generated user contribution ratings for content-providing users may be used at least in part to facilitate managing the content provided by those users, such as by assisting in identifying content that has attributes of interest (e.g., content that is useful, humorous, or that otherwise has a sufficiently high degree of quality).

A piece of content that is provided may have a variety of forms in various embodiments, such as the following non-exclusive list: a product review or other item review, a how-to guide or other instructional information related to one or more topics, a blog or blog blurb (or other entry in or portion of a blog), another form of textual passage (e.g., a story, poem, recipe, etc.), a discussion board or message thread or an entry in such a board or thread, a media file or streaming media clip (e.g., a photo or other image, a video, a music sample or other audio clip, etc.), a user profile from a social networking site or other information related to social networking, an advertisement, a computer program or portion of computer code, a software module or utility or library, a list of related items or other elements (e.g., pieces of information of one or more types, indications of other lists or other content pieces, etc.) or other type of list, etc. More generally, a piece of content that is provided may in some embodiments be any information that has one or more attributes that can be evaluated by other users (e.g., information that includes one or more factual assertions or opinions, with the evaluations used to certify the accuracy and/or truthfulness of those assertions, or information that is to be evaluated based on one or more subjective standards, such as elegance or beauty). Moreover, in some embodiments, the pieces of content may be user-supplied, such as supplied to a Web merchant or other online merchant for use by the merchant (e.g., supplied by customers of the merchant for possible display to other customers). In other embodiments, one or more of the previously indicated types of content pieces may be supplied to an online or other service that uses user-supplied content pieces in various ways, such as a fee-based commercial content provision service that makes user-supplied content pieces available to customers of the service as at least part of a business, or such as a non-commercial content provision services that makes user-supplied content pieces available to other users without obtaining payment from those other users.

As previously noted, in at least some embodiments, a user contribution rating for a content-providing user may be generated based at least in part on an assessed quality of the content provided by the user. In such embodiments, the quality of provided content may be assessed in various ways. For example, in some such embodiments, the quality of a provided piece of content may be assessed based at least in part on evaluations of the piece of content (e.g., votes on or other forms of rating of one or more attributes of the content) that are obtained from evaluator users other than the author user or other content-providing user who provided the content piece. In other embodiments, assessment of the quality of a provided piece of content may be performed in other manners, such as based at least in part on an automated analysis of the content piece. Additional details regarding assessment of content quality are included below, and further details are included in the following patent applications, each of which is hereby incorporated by reference in its entirety: co-pending U.S. patent application Ser. No. 10/646,341, filed Aug. 22, 2003 and entitled "Managing Content Based On Reputation"; co-pending U.S. patent application Ser. No. 11/290,623, filed Nov. 30, 2005 and entitled "Assessing Content Based on Assessed Trust in Users", which is a continuation-in-part of U.S. patent application Ser. No. 10/646,341, filed Aug. 22, 2003 and entitled "Managing Content Based On Reputation," and which is a continuation-in-part of U.S. patent application Ser. No. 11/165,842, filed Jun. 24, 2005 and entitled "Exchanging User Reputation Information"; and co-pending U.S. patent application Ser. No. 11/096,699, filed Mar. 31, 2005 and entitled "Automatic Identification of Unreliable User Ratings." In addition, in at least some embodiments in which votes, ratings or other evaluations received from evaluator users are used to assess the quality and/or other attributes of content pieces provided by content-providing users, the received evaluations may be pre-processed in various ways before their use for the assessment, such as to remove or otherwise reduce the influence of some evaluations if they are automatically determined to at least potentially be unreliable or have other defined characteristics that are not desired. Additional details related to such assessment of evaluations are included in U.S. patent application Ser. No. 12/165,398, filed concurrently and entitled "Assessing User-Supplied Evaluations," which is hereby incorporated by reference in its entirety.

FIG. 1 is a network diagram that illustrates an example environment in which content-providing users may provide pieces of content to a remote system, which in this example embodiment is a content management system 146. In this example, various users interact with the content management system 146 via a network 100, and an embodiment of a User Contribution Rating System 142 operates to assess content contributions of content-providing users. In particular, in this example, content-providing users 110 interact with the content management system 146 over a network 100 to provide one or more content pieces for use by the content management system, such as for the content management system 146 to distribute the content pieces to content evaluator users 120 and/or other users 130 via the network 100. The illustrated User Contribution Rating System 142 assesses some or all of the content-providing users based at least in part on the pieces of content provided by those content-providing users and/or on aspects related to how and when those content pieces are provided, including by generating at least one user contribution rating for each of those content-providing users.

The illustrated network 100 may be, for example, a publicly accessible network of linked networks, possibly operated by various distinct parties (e.g., the Internet). In other embodiments, the network 100 may be a private network (e.g., a corporate, university, etc.) that is wholly or partially inaccessible to non-privileged users. In still other embodiments, the network 100 may include one or more private networks with access to and/or from other private and/or public networks. In this illustrated example, the various users 110, 120, and 130 may use computing systems and/or devices (not shown) to interact with the content management system 146 to obtain various functionality, and in doing so may obtain and/or provide various types of information (e.g., user-provided content pieces, evaluations, etc.). The interactions of the users with the content management system 146 may occur in various ways in various embodiments, such as, for example, in an interactive manner via one or more graphical user interfaces provided to the users (e.g., a graphical Web-based user interface via a Web browser), or in a programmatic manner based on an API ("application programming interface") provided by the content management system 146 to allow other computing systems and programs to programmatically invoke such functionality, such as using Web services or other messaging or networking protocols.

In the illustrated embodiment, the content management system 146 may be operated by an entity 140 that gathers and/or distributes content, with the entity 140 optionally also operating the User Contribution Rating System 142 in this example, although in other embodiments the User Contribution Rating System 142 may be operated by a third party to the entity 140 (e.g., in a fee-based manner to support one or more remote content management systems). Various users, including the users 110, 120 and/or 130, may interact with the content management system 146 (and/or with another system, not shown, that has access to content pieces provided to the content management system 146 by the content-providing users 110) to obtain information that may include at least some of the content pieces provided by content-providing users 110. For example, content pieces received from the content-providing users may be provided in part or in whole to other users for presentation to those other users, such as via various content presentation software programs available to the other users (e.g., Web browsers, media players, content readers, etc.). As one illustrative example discussed in more detail below, the content management system may be part of a Web merchant or other online merchant that sells or otherwise makes items available to customer users, and the content-providing users may be customers of the merchant who submit content pieces that are related to the available items (e.g., reviews of the items, images of the items, instructional guides related to use of the items, etc.). In such embodiments, the merchant may use the customer-provided content pieces in various ways, such as to provide some or all of them to other customers, such as in conjunction with other information provided by the merchants (e.g., product information related to products available from the merchant). It will be appreciated that content may be distributed from a content-providing user or other content-providing entity to other users in various other ways in other embodiments (e.g., by using broadcast techniques, peer-to-peer distribution techniques, etc.).

The content evaluator users 120, in this illustrated embodiment, may interact with content management system 146 to evaluate content pieces submitted by the content-providing users 110. As previously noted, content pieces may be evaluated on the basis of one or more attributes of interest of the content pieces, such as usefulness, humor, excellence, beauty, etc. In the illustrated embodiment, the content evaluator users 120 may interact with the content management system 146 to obtain content pieces submitted by content-providing users 110, and to provide evaluations of content pieces with respect to one or more of various attributes, such as by submitting votes on and/or ratings regarding the one or more attributes. As discussed in more detail elsewhere, such evaluations of content pieces may be used, for example, to determine an aggregate assessment of quality of content pieces provided by a particular content-providing user and/or to assist in determining a user contribution rating of the content-providing user (e.g., based in part on a determined aggregate assessed quality of the content pieces provided by the content-providing user). In some embodiments, evaluations of content pieces may further be used to determine content quality ratings for the content pieces, such as by generating an individual content quality rating for each content piece based at least in part on the evaluations received for that content piece, and in some such embodiments, such content quality ratings may be used at least in part to determine a user contribution rating of the content-providing user who provided the content pieces.

In the illustrated embodiment, the User Contribution Rating System 142 operates to assess some or all of the content-providing users 110 based at least in part on the content pieces submitted by the content-providing users 110. For example, the User Contribution Rating System 142 may assess a particular content-providing user based on the content pieces provided by that content-providing user, such as by generating a user contribution rating for the content-providing user based on a combination of multiple factors related to the provided content pieces. In various embodiments, at least some of the multiple factors may include one or more of the following: a quantity of the content pieces submitted by the content-providing user, whether a total quantity of all the user's submitted content pieces or for a subset of the user's submitted content pieces that satisfy one or more criteria, and whether with all of those submitted content pieces being treated equally or instead giving some of those submitted content pieces different weights based on one or more properties of the content pieces (e.g., a recency of the content piece being submitted by the content-providing user, a type of the content piece, a subject of the content piece, etc.); one or more assessed qualities of the content pieces submitted by the content-providing user (e.g., such as based on one or more assessed attributes of the content pieces), such as individual content piece quality assessments and/or an aggregate quality assessment of all of the content pieces submitted by the content-providing user; and a quantity of evaluator users who have evaluated at least one of the content pieces submitted by the content-providing user, whether with all of those evaluator users being treated equally or instead giving some of those evaluator users different weights (e.g., based on when an evaluator user last evaluated one of the content pieces submitted by the content-providing user). In addition, in some embodiments, one or more other factors may be considered, whether in addition to or instead of the other previously indicated factors, including a recency of at least some assessments of at least some of the content pieces (e.g., such as based on when one or more evaluations were received from one or more content evaluator users 120), an assessed trust value and/or reputation of the content-providing user and/or the content evaluator users who evaluate the computing-providing user's supplied content pieces (e.g., based on a relationship of the user to an entity, such as a user's customer relationship with a merchant; based on a user's certification, degree, training, education, etc.), and/any other factors that may be indicative of value or other desired characteristics of a content-providing user's contributions (e.g., a number of times one or more content pieces of a content-providing user has been selected by other users 130, such as including "hits," "views," "downloads," "click-throughs," etc.).

In addition, in at least some embodiments, the User Contribution Rating System 142 may assess a particular content-providing user by generating multiple user contribution ratings for the content-providing user that each has a distinct type to reflect a distinct characteristic or other type of information about the content-providing user. In various embodiments, at least some of the distinct generated user contribution ratings for a content-providing user may include the following: to correspond to one or more particular types of content pieces submitted by the content-providing user (e.g., item reviews, images, etc.); to reflect supplied content pieces that correspond to one or more particular categories or groups of items (e.g., books, DVDs, consumer electronics, etc.); to correspond to one or more particular types of activities in which the content-providing user participates (e.g., creating content pieces to be submitted, selecting content pieces created by others to be submitted, evaluating content pieces provided by others, etc.); to correspond to one or more particular groups of users to which the content-providing user belongs; etc. Techniques for generating one or more user contribution ratings are discussed in more detail below.

Furthermore, in some embodiments, the illustrated User Contribution Rating System 142 may generate ranking information for at least some content-providing users based on generated user contribution ratings of those content-providing users, such as relative to other content-providing users (e.g., based on those other content-providing users' generated user contribution ratings). Such generated user ranking information may be used in various manners, such as to identify one or more top-ranked content-providing users (e.g., to create and/or maintain one or more "leader boards" or "ladders" or other lists of content-providing users based on user contribution ratings and/or other information about content-providing users, such as to have one such list for each of one or more types of user contribution ratings), to identify one or more content-providing users to reward based on their contributions, to manage content in various ways, etc. Such created and/or maintained lists of content-providing users may be used by the system 142 in various ways, such as to display information about some or all content-providing users on the lists to those users and/or to other users (e.g., to all users of the system 146). In other embodiments, one or more such lists may be created based on other types of information about content-providing users (or other users), such as a list of top-rated content-providing users based on user contribution ratings of those users (e.g., ratings of a particular type if multiple types of user contribution ratings are used). Furthermore, in some embodiments, other types of information may be displayed for some or all content-providing users, such as to indicate for a content-providing user the number of evaluator users and/or other users that are identified by the system 142 and/or self-identified by those users as being fans or critics of the content-providing user, or other types of information discussed in greater detail below.

In some embodiments, the content management system 146 may perform various other functions, such as, for example, storing content pieces provided by content-providing users for later use by the system 146 and/or by others (e.g., in a database or other data storage system); providing other content in addition to or instead of user-provided content to various parties (e.g., entities, users, etc.); providing information related to assessed user contribution ratings and/or user rankings to various parties; identifying content pieces that have or are likely to have attributes of interest to one or more users, such as based on assessed user contribution ratings of the content-providing users who provided the identified content pieces (e.g., content pieces that are useful and/or humorous); etc.

Although the User Contribution Rating System 142 and the content management system 146 have been described in this example as being distinct systems, in other embodiments some or all of the functionality of the systems 142 and 146 may be combined into a single system. In addition, it will be appreciated that in some situations, various of the users 110, 120 and 130 may operate in different roles, such as at different times and/or for different content pieces. For example, a content-providing user 110 may also act as a content evaluator user 120, such as when the content-providing user 110 evaluates content pieces provided by other content-providing users, and/or as another user 130, such as when one or more content pieces provided by other content-providing users are provided to the content-providing user 110. Similarly, content evaluator users 120 and other users 130 may act as content-providing users 110 and each other in different situations. As one particular example, in some embodiments, any user may be allowed to act as an evaluator user for content pieces provided by other users (e.g., when the evaluator user receives a content piece that is selected for the evaluator user by the content management system 146, when the evaluator user selects a content piece to be evaluated, etc.), and/or any user may be allowed to act as a content-providing user, while in other embodiments only particular users may be allowed to perform particular actions, or users may be allowed to perform particular actions only in particular circumstances.

Figure 5:
Figure 6:

FIGS. 2-6 illustrate examples of displays for obtaining, presenting and evaluating user-supplied content and for presenting information about top-ranked content-providing users, such as content-providing users ranked according to one or more generated user contribution ratings. In particular, FIGS. 2-5 show examples of ways in which information about top-ranked content-providing users (in this example being "reviewer" author users who are supplying item review content pieces) can be provided to users of a Web site. FIG. 6 illustrates an example display that enables a content-providing author user to submit a new item review piece of content, with analogous information to allow evaluating users to submit evaluations similarly able to be provided (although not shown here for the sake of brevity). These examples are provided for illustrative purposes and are simplified for the sake of brevity, and the inventive techniques can be used in a wide variety of other situations, including with other types of content, other types of users, other types of evaluations, and by entities other than merchants.

Figure 3:
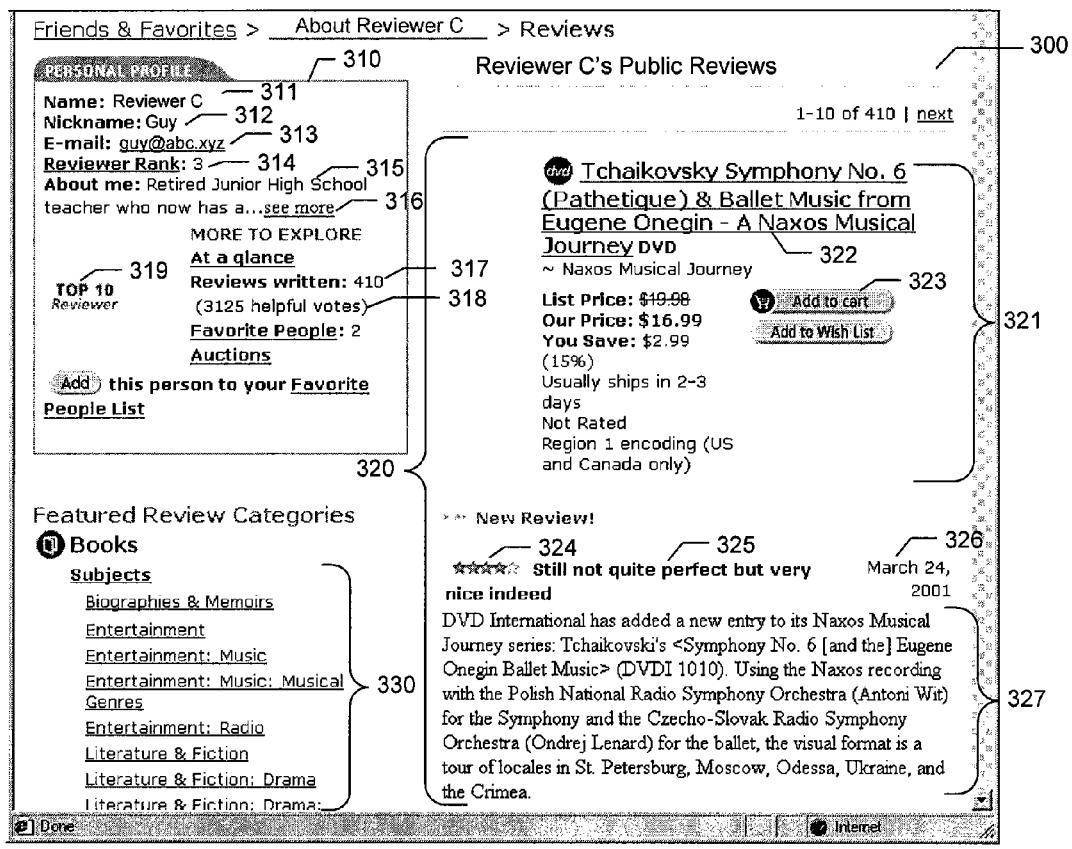

In particular, FIG. 3 is a display diagram illustrating an example of a display 300 that provides information about a particular top-ranked reviewer user and an example of an item review piece of content 327 that is authored by the user, with analogous information about a particular top-ranked evaluator similarly able to be provided (although not shown here for the sake of brevity). This example display is displayed as part of an example Web site of an example Web merchant, and contains various information 320 about the review 327, such as information 321 about the item being reviewed (e.g., the title, artist, format, price, and availability of the item), a link 322 that may be used to display more information about the item, and a control 323 that may be used to initiate the placement of an order for the item. The information 320 also includes a rating or grade 324 assigned by the reviewer to the item as part of the review—here the grade shown is four stars out of five stars, and the review's title 325 and date on which the review was submitted 326 are also displayed. The illustrated display also contains more general information about reviews submitted by the reviewer, including a section 330 that illustrates item categories for which the reviewer has submitted reviews.

In this example, the display 300 further includes a profile 310 for the reviewer, with such information as the reviewer's name 311, a nickname 312 for the reviewer, an email address 313 for the reviewer, the current rank 314 of the reviewer, the beginning of a biographical sketch 315 of the reviewer, a link 316 to the entire biographical sketch of the reviewer, a count 317 of the quantity of reviews submitted by this reviewer, a count 318 of one type of assessment for the reviewer (in this case, the number of positive rating votes cast for the reviews of this reviewer by evaluators), and a graphical badge indication 319 related to the rank of the reviewer—in other embodiments, some or all of this information may instead be presented in other formats or instead not be presented. In addition, while not illustrated here, in some embodiments one or more assessed user contribution scores or ratings for the reviewer may be displayed, while in other embodiments such information may be used only for internal purposes by the merchant (e.g., as part of determining a reviewer's rank, etc.) and not made directly available to the reviewer user and/or to other users.

FIG. 4 is a display diagram illustrating an example of a display 400 that provides detailed information about an available item along with item review content regarding the item. In this example, the item is the Tchaikovsky Symphony No. 6 DVD whose review is shown in FIG. 3, and the display 400 illustrates a portion of a Web page provided to a customer with information about the item (e.g., in response to the selection of link 322 shown in FIG. 3, or otherwise as requested by the customer). In addition to other information about the item, the display includes a list of one or more item review pieces of content submitted for the item by review authors, including review 410 submitted by reviewer user Reviewer C. In this example, the display of the review 410 includes the reviewer's name 411 (which in this example is a link to the display shown in FIG. 3); a graphical badge 412 related to the current rank of the reviewer; the item rating or grade 413 assigned to the item as part of the review; the review title 414; and the textual item review piece of content.

In addition, in embodiments in which this display is provided to a user other than Reviewer C who has not yet evaluated this review of the item by Reviewer C, the display may further include review evaluation rating selections to allow the user to act as an evaluator and provide an evaluation for the review. In this example, two evaluation rating selections 415 and 416 are displayed to allow the user to specify a quantitative rating (or "vote" or "assessment") of the content for each of two rating dimensions, which in the illustrated example are humor and usefulness. Other rating dimensions may instead allow quantitative ratings in a binary manner (e.g., via "yes" and "no" votes, such as in rating selection 417 for a prior item review shown for the item), in an n-ary manner (e.g., rating on a scale of 1-10 or 1-100, etc., such as similar to rating selections 415 and 416), in a non-quantitative manner (e.g., by gathering textual comments about the review), in a manner relative to other evaluations (e.g., this is the most informative of all current evaluations for this content, or of all evaluations by this evaluator, or of all the evaluations for any content), etc. The display further includes a link 421 that solicits the user to author his or her own review of the Tchaikovsky Symphony No. 6 DVD item, such as when the user has not yet provided a review for the item, as discussed further with respect to FIG. 6.

FIG. 6 is a display diagram illustrating an example of a display that enables an author user to submit a new review piece of content, with analogous information to allow evaluators to submit textual and other evaluations similarly able to be provided (although not shown here for the sake of brevity). The user typically receives this display in conjunction with a particular item, for which the user can submit a review, although in other situations users could submit information not specific to an item (e.g., a blurb for a personal blog of the user). In this example, display 600 is provided in response to the user's selection of link 421 in the display containing detailed information about the Tchaikovsky Symphony No. 6 DVD shown in FIG. 4. The display includes the identity of the user 601, which is attributed as the identity of the reviewer. To attribute a different identity to the reviewer, the user can select link 602. The display also includes information 603 identifying the item to be reviewed, a control 604 used by the user to specify a grade or rating for the reviewed item, a field 605 for entering a title for the review, and a field 606 for entering the textual or other contents of the review. In this example, the user may select radio button 607 in order to display a reviewer name with the review, which may be edited in field 608. Alternatively, the user may select radio button 609 to make the review anonymous (which in some embodiments may cause the submission of the review and/or any rating of the review to not affect the author's user contribution rating). The display also includes field 610 for entering the author's location, although in embodiments in which the user has previously corroborated his/her identity, information such as that in fields 608 and/or 610 may not be displayed or modifiable. Before preparing the review as described, the user may also select link 621 in order to display guidelines for preparing the review and/or may select link 622 in order to display one or more example customer reviews demonstrating compliance with the review guidelines. When the user has assembled the review to be submitted, the user selects button 611.

FIG. 5 is a display diagram illustrating an example of a display 500 that provides information about two randomly-selected top-ranked reviewers as part of a portion of a Web page related to other types of information, with analogous information about top-ranked evaluators similarly able to be provided (although not shown here for the sake of brevity). The display 500 includes a list 510 of randomly-selected highly ranked reviewers, which can be comprised of one or more entries, and in this illustrated embodiment includes entries 520 and 530. The display also includes a link 540 to the top reviewer's list shown in FIG. 2, which is a display diagram illustrating an example of a display 200 that shows a list of top-ranked reviewers. This example display 200 includes language 201 congratulating the top-ranked reviewers and an ordered list 210 of the top-ranked reviewers. List 210 is comprised of ordered entries, each corresponding to one top-ranked reviewer, such as entries 220, 230, and 240. As an example, entry 220 contains information about the highest-ranked reviewer, Reviewer A. This entry contains the reviewer's rank 221, as well as a graphical badge 222 indicating the rank. The entry further contains the name of the reviewer 223, which is a link that the user can select in order to view more detailed information about this reviewer, as well as an indication 224 of the total number of reviews authored by this reviewer. The entry also contains further information 225 about the reviewer, which is typically provided by the reviewer. The information in this example includes a link 226 that may be selected by the user to display additional information about the reviewer. Some entries also contain an image of the reviewer, such as image 237 shown in entry 230. In addition to the list 210 of detailed entries about the top-ranked reviewers, the display also contains a more abbreviated list 250 of the top-ranked reviewers. In this list, each entry is merely the rank value and the name of the reviewer, which is a link that may be selected by the user to display additional information about the reviewer. Such information about top-ranked reviewers, and analogous information about top-ranked evaluators, may similarly be provided in a variety of other ways.

While the examples discussed above with respect to FIGS. 2-6 have included a number of simplifying assumptions for the sake of clarity, in other embodiments a variety of additional types of information and techniques may be used as part of automatically assessing user contribution scores and other ratings for author users and other content-providing users, as well for automatically assessing quality and other attributes of pieces of content, and as well as for automatically assessing user contribution scores and other ratings for other types of users (e.g., evaluator users). For example, in some of the examples discussed above, each user was assessed a single user contribution score that was used on behalf of the user in various ways. In other embodiments, each user may instead have multiple such assessed user contribution scores or other ratings that may be used in different manners, such as to reflect different types of activities of the user that are used as part of the assessment (e.g., to reflect a role of the user, such as when acting as a content provider, evaluator, etc.), different types of pieces of content that the user may supply and/or evaluate (e.g., content of different forms, such as item reviews versus photos; content with different types of subject matter, such as item reviews or other supplied content for books versus item reviews or other supplied content for electronics; etc.), and/or different time frames in which a user provided the pieces of content and/or the pieces of content are evaluated (e.g., to reflect a user's user contribution rating within a particular time frame, such as to determine a top reviewer user of the month, year, etc.).

In addition, in some embodiments the various users may be clustered into multiple user groups in various manners (e.g., based on similarities in their activities, opinions, demographic information, shopping activities, assessed user contribution scores, etc.), and each user may further be assessed one or more user contribution scores for each of the user groups (e.g., to reflect that the other users in the group to which a user belongs consider the content supplied by the user to be highly useful, while users in other groups do not consider the user's supplied content to be useful). Alternatively, in some embodiments information from a user (e.g., supplied pieces of content and/or evaluations) may only be used with respect to other users in the same group, such as to be provided to them and to receive evaluations from them. Such groups of users may be determined in various ways, including in an automated manner using one or more clustering algorithms (e.g., a k-means cluster analysis). In at least some such embodiments, each user may be assigned to a single user group, while in other embodiments a user may be part of multiple user groups (e.g., different groups for different roles or other activities of the user).

In a similar manner, in some embodiments, each piece of content may have multiple assessed content quality scores that not only reflect different attributes (or aspects or qualities or properties) of the content piece (e.g., helpfulness or more generally usefulness, informativeness, inappropriateness, accuracy, being spam, humorousness, etc.), but that further reflect different user groups. Thus, for example, a piece of content may have an assessed usefulness score for a first group of users that is high, and have other assessed usefulness scores for other groups of users that are low (e.g., to reflect different opinions or perspectives of users in different groups; to reflect different capabilities or knowledge of users in different groups, such as to be highly useful to a group of users with a high degree of specific technical knowledge but to be of little use to users without that technical knowledge; etc.). In order to assess the different scores for different groups of users, in some embodiments only evaluations from other users in the group will be used, or evaluations from users in other groups may be discounted. In addition, in at least some embodiments, scores for different groups of users may be assessed in different manners, such as based on input received from users in those groups or on other information specific to the group. Furthermore, in embodiments in which users may each have multiple assessed user contribution ratings, different assessed contribution ratings of a user may be used when assessing scores for different groups of users, such as to use an assessed contribution rating specific to a group of users. In addition, in some embodiments other information specific to a user may further be used to influence content submissions and/or evaluations from that user, such as an indication of a degree of authority of a user (e.g., to give increased influence based on credentials or recognition in a particular area), other relationships of the user with respect to the merchant (e.g., to give increased influence to a best-selling author of books, at least with respect to submissions and/or evaluations of related material), a relationship of the user with respect to a recipient user who may be provided with content (e.g., to give increased influence to evaluations from users on a buddy list of the recipient user when assessing a content quality score for a piece of content to potentially be provided to the recipient user, such as on a per-recipient user basis, or to give increased influence to evaluations from users who are in a same user cluster or user group as the recipient user).

In some embodiments, users each may further be provided with information that is specific to that user, such as based at least in part on a user group to which that user belongs and/or based on other user characteristics or user-specific information. For example, if content pieces are assessed with different ratings for different user groups, users of a particular group may only be provided with access to content that is sufficiently highly rated for that group, even if other content was highly rated for other groups. Alternatively, all content pieces may instead be available to users of the particular group, but the content ratings specific to that group may be used to influence when and how pieces of content are provided to the users (e.g., in an evolutionary display lifecycle to allow the most highly rated content to be identified and used, such as to primarily show highly rated content, but to also show at least occasional indications of new content to allow evaluations to be received for it and to show at least occasional indications of lower-rated content (such as randomly) to allow subsequent evaluations to raise the ratings if the prior ratings were not reflective of the actual eventual ratings for the content).

In addition, in at least some embodiments, a variety of additional criteria are used when assessing quality related to a piece of content, such as to use additional scaling factors, to account for the number of evaluations received for or other "impressions" of displaying the piece of content in various ways, and to use multiple types of user ratings of the piece of content, as discussed in greater detail below. More generally, in some embodiments a variety of other types of factors may be considered as part of assessment of quality of a piece of content, such as activities of the supplier of the content piece to update or otherwise maintain the content piece, a relationship of the piece of content to a corresponding item (e.g., an item being reviewed or described), a rating or grade given to an item to which a provided content piece corresponds (e.g., a number of stars on a scale of 1-to-5, such as for a low rating to contribute more or less to the content piece's quality than a high rating), ways in which users use the piece of content (e.g., sending to other users, adding to favorites lists or watch lists for changes, etc.), etc.

As noted above, in some embodiments, the described techniques are used by Web and other online merchants and others to enhance the usefulness of content provided to users (also referred to as "surfacing" the content) for items available from their Web sites or otherwise available. In other embodiments, the described techniques may be used in other ways, such as by an entity providing the techniques to external third-parties (e.g., as a Web service to customers for a fee, such as merchant customers). In addition, in some embodiments various of the calculated and otherwise assessed information (e.g., assessed user contribution ratings, assessed content quality values, etc.) and/or other types of related data (e.g., data available for use in doing the assessing, such as evaluations provided by evaluators and/or information about activities of users) may be provided to external third parties, such as to allow a user to export their assessed user contribution ratings to Web sites of others in order to receive benefits from those others that are commensurate with those ratings, or to allow the other Web site to better customize their Web site to the users. Similarly, in some embodiments, various types of related information could be received from one or more third parties (e.g., contribution ratings for content supplier users and/or evaluator users that were calculated by the third parties, or instead other types of related data available from the third parties, such as data that can be used when doing the assessment of user contribution ratings), and then used in assessing the user contribution ratings of content-providing users and/or evaluator users (or other types of users). Such exchange of assessment-related information to and/or from one or more systems performing assessments may in some embodiments be performed for a fee or other compensation, whether to the system(s) from the third party or instead from the system(s) to the third party.

For illustrative purposes, some embodiments are described below in which specific types of content are provided by content-providing users (also referred to as "content providers") and in which specific types of evaluations of the content are provided by other users. In addition, a variety of details are discussed below regarding specific techniques for calculating specific types of user contribution scores and other ratings for specific types of content-providing users, and for using them in specific ways to provide benefits to requesters of content (e.g., other users, shoppers, etc.). However, it will be appreciated that the inventive techniques are not limited to these details and can be used in a wide variety of other situations, such as to determine and track information about other types of individuals and/or entities (e.g., suppliers, manufacturers, partners, vendors, affiliates, employees, customers, etc.) that provide information/content.

As previously noted, the assessment of an author user and other content-providing user may be performed in various manners in various embodiments, such as to generate one or more user contribution scores or other user contribution ratings for some or all such users to reflect one or more attributes of interest regarding the provision of content by the users. For example, a user contribution rating for a content-providing user may be generated to reflect a combination of multiple factors, such as a quantity of pieces of content provided by the user, a recency of providing some or all of the content pieces, an assessed quality of the provided content pieces, a regularity of providing content pieces, a quantity of distinct evaluator users who have evaluated at least one or all of the content pieces provided by the user, etc. In some embodiments, a user's user contribution rating may increase and/or decrease as one or more factors change. For example, in some embodiments, a user's user contribution rating may increase as a user's quantity and/or assessed quality of content contributions increases. Conversely, in some embodiments, a user's contribution rating may decrease if a user's contributions are of low assessed quality, and/or if the user does not contribute new content pieces in a timely manner, etc.

The following illustrative embodiment provides one example of specific techniques for generating user contribution ratings of content-providing users. In particular, in this illustrative example, contribution ratings are generated for content-providing users based on content pieces related to product reviews and other item reviews provided by the content-providing users acting as reviewers, so as to reflect a quantity of provided item review content pieces, an assessed quality of provided item review content pieces (e.g., based on one or more evaluations provided by evaluator users who assess one or more item review content pieces provided by content-providing reviewer users), a recency of at least some of the item review content pieces being provided by content-providing reviewer users, and a quantity of evaluator users who assess item review content pieces provided by the reviewer users.

For example, in one such example embodiment, a user contribution rating of a reviewer may be generated according to the following equation, $$s = \overline{O} * w(s_r, s_v) + O_{base} * (1 - w(s_r, s_v)),$$

with s being a value indicative of the generated user contribution rating of a content-providing reviewer user (also referred to as a "reviewer" or "reviewer user"), with $\overline{O}$ being an aggregate assessed quality of a reviewer's item review content pieces (also referred to as an "item review" or "review"), with $s_r$ being a value indicative of a quantity and recency of reviews provided by the reviewer, with $s_v$ being a value indicative of a quantity of evaluator users who have provided evaluations of the reviewer's reviews and recency of their provided evaluations, with w being a weight function w: R×R→[0, 1] that assigns greater weight as $s_v$ and $s_r$ increase, and with $O_{base}$ being a default assessed aggregate quality of a reviewer's reviews (or other content piece contributions). In this example embodiment, a reviewer who has provided reviews, but has received no evaluations for the reviews, has an initial weight $w(s_r, s_v)$ of 0, resulting in the reviewer user's user contribution rating s being equal to the default assessed aggregate quality $O_{base}$. As the reviewer provides reviews and those reviews receive evaluations from evaluators, $s_v$ and $s_r$ increase and $w(s_r, s_v)$ approaches 1, resulting in the user contribution rating of the reviewer approaching the assessed aggregate quality of reviews $\overline{O}$.

In some embodiments, the assessed aggregate quality of a reviewer's reviews $\overline{O}$ may be a weighted average of assessments of the reviewer's reviews by one or more evaluator users within a given window of time (e.g., a contribution rating window). For example, in one such embodiment, $\overline{O}$ may be determined using the following equation, $$\overline{O} = \frac{\sum_{v \in V} O_v * d_v(v)}{\sum_{v \in V} d_v(v)},$$

with V being a set of evaluator users who have evaluated one or more of the reviewer's reviews within the contribution rating window, with $O_v$ being an assessment of the reviewer's reviews that have been evaluated by a single evaluator user v from the set of evaluators V, and with $d_v(\ )$ being a decay function (discussed below) that gives greater value for more recent assessments provided by evaluators over earlier provided assessments, such that $\overline{O}$ may more closely reflect recent assessments of the reviewer over older assessments. Examples of possible values for a contribution rating window include 1 year, 3 years, and an unlimited amount of time.

In some embodiments, the value $O_v$ that is indicative of an assessment of a reviewer's reviews that have been evaluated by a single evaluator user v may reflect the evaluator v's history of evaluations of the reviewer's reviews (e.g., such as positive and negative evaluations provided over time). For example, in some embodiments, $O_v$ may be a determined strength between the single evaluator v and the reviewer's reviews, such as based on a weighted average of age-decayed evaluations of the reviewer's reviews by the evaluator v according to the following equation, $$O_v = \frac{\sum_i u_i d_u(a_i)}{\sum_i d_u(a_i)},$$

with $u_i$ being the i-th assessment value (e.g., a quantitative rating or vote) from the evaluator v on any of the reviewer's reviews, with $a_i$ being the age of the i-th assessment $u_i$, and with $d_u(a_i)$ being a decay function (discussed below) such that more recent evaluations are given more weight in the weighted average, thus reflecting the evaluator's recent assessment(s) of the reviewer's reviews. For example, in some embodiments, each assessment value $u_i$ may be a value indicative of whether a given evaluator user v found a particular review of the reviewer to be helpful, and in some such embodiments, an assessment value of 1 may indicate that the evaluator found the review helpful, and an assessment value of 0 may indicate that the evaluator found the review unhelpful. In such an embodiment, $O_v$ evaluates to a real number between 0 and 1, with evaluated values closer to 1 indicating that the evaluator found the reviewer's reviews to be relatively helpful, while values closer to 0 indicate that the evaluator found the reviewer's reviews to be relatively less helpful. In other embodiments, other rating dimensions (e.g., humor, beauty, etc.) and/or types of assessment values (e.g., n-ary value assessment scales, such as 0-10, 1-100, etc.; non-numeric values, such as from a set of enumerated values; etc.) may be used. In addition, in some embodiments, evaluations may not be age decayed, such that an evaluation does not decrease in value over time.

In some embodiments, the value that is indicative of a quantity and recency of reviews provided by a reviewer, $s_r$, may be a total number of age-decayed reviews written by the reviewer within the contribution rating window. For example, in one such embodiment, $s_r$ may be calculated using the following equation, $$s_r = \sum_{r \in R} d_r(a_r),$$

with R being a set of reviews written by a reviewer during the contribution rating window, with $a_r$ being the age of a review r from the set R, (e.g., the age $a_r$ may be an amount of time between the creation of the review r and the time that the user contribution rating is computed), and with $d_r(\ )$ being a decay function (described below) such that older reviews are given less weight than more recent reviews. In other embodiments, the value $s_r$ may be calculated in other ways, such as, for example, with $s_r$ being a total of the quantity of reviews written by the reviewer without considering recency of the review.

In addition, in some embodiments, the value indicative of a quantity of evaluator users who have provided assessments of a given reviewer and/or recency of such evaluations, $s_v$, is the total number of age-decayed evaluations of the reviewer's reviews within a given window of time (e.g., a contribution rating window). For example, in one such embodiment, $s_v$ may be calculated using the following equation, $$s_v = \sum_{v \in V} d_v(a_v),$$

with V being a set of distinct evaluator users who have evaluated one or more of the reviewer's reviews, with $a_v$ being an age of an evaluation provided most recently by the evaluator user v from the set V, and with $d_v(\ )$ being a decay function (described below) to reflect when the evaluator user v last evaluated the reviewer's reviews, such that reviewers whose reviews have not received many recent evaluations will have a decreased score relative to reviewers whose reviews have more recent evaluations. This may be useful, for example, to boost ratings of reviewers who are currently popular with evaluator users and encourage reviewers to provide relevant reviews. In other embodiments, the value $s_v$ may be calculated in other ways, such as, for example, with $s_v$ being a total quantity of evaluations provided by some or all evaluator users, a total number of evaluator users who have evaluated contributions by the content-providing user, etc. In other embodiments, the value $s_v$ may or may not reflect recency of evaluations.

As previously noted, one or more decay functions may be used in the illustrated example of generating a user contribution rating s. For example, decay functions $d_r$: $R \rightarrow [0, 1]$, $d_v$: $R \rightarrow [0, 1]$ and $d_u$: $R \rightarrow [0, 1]$ may take as input the age of an element (e.g., a review, an evaluation, etc.) and compute a weight for the element based on the age. For example, the older an element is, the closer its weight will be to 0 and, conversely, the more recent the element, the closer its weight will be to 1. Decay functions may be implemented in a variety of ways in a variety of embodiments to reflect a variety of different types of age decay (e.g., rate of decay, etc.). For example, in some embodiments, a decay function may be represented as a linear function, a quadratic function, an exponential function, and/or other type of function. In some embodiments, a linear decay function may be expressed by the equation, $$d(x) = 1 - x/W,$$

with x being the age of an element and W being the length of time in the contribution rating window. In some embodiments, a quadratic decay function may be expressed by the equation, $$d(x) = 1 - x^2/W^2,$$

with x being the age of an element and W being the length of time in the contribution rating window. In addition, in some embodiments, an exponential decay function may be expressed by the equation, $$d(x) = \left(\frac{1}{2}\right)^{\frac{x}{H}},$$

with x being the age of an element and H being a specified half-life (e.g., such as a specified number of days, months, and/or years, etc.). In various embodiments, all three decay functions $d_r$, $d_v$ and $d_u$ may be the same (e.g., a linear, quadratic or exponential decay function), whereas in other embodiments, one or more of the decay functions may vary with respect to one or more of the other decay functions, depending on the desired behavior.

As previously noted, the weight function w: $R \times R \rightarrow [0, 1]$ takes as input values related to quantity and recency of submitted reviews and review evaluations (e.g., $s_r$ and $s_v$, respectively), and outputs a weight between 0 and 1. For example, as either $s_r$ or $s_v$ increases, the function $w(s_r, s_v)$ may monotonically increase to a value that is less than or equal to 1. As one example, the function w may be represented by the equation, $$w(s_r, s_v) = f(s_r, \beta_r) * f(s_v, \beta_v),$$

with $f(\ )$ being a squashing function that takes as input a positive real number and squashes it to a value between 0 and 1, and with $\beta_r$ and $\beta_v$ being constants associated with a number of submitted reviews and a number of review evaluations, respectively. For example, in some embodiments, larger constant values of $\beta_r$ may influence the equation such that a greater quantity of recent reviews is required to achieve a value of $w(s_r, s_v)$ close to 1, and larger constant values of $\beta_v$ may influence the equation such that a greater quantity of recent review evaluations is required to achieve a value of $w(s_r, s_v)$ close to 1. Examples of possible values of $\beta_r$ and $\beta_v$ include 20 and 1000, respectively.

The squashing function $f(\ )$ may be implemented in a variety of ways in a variety of embodiments. For example, in some embodiments, the squashing function may take as input a positive real number (e.g., $s_r$ or $s_v$) and map it to a curve with a resulting value between 0 and 1, with a control parameter ($\beta_r$ or $\beta_v$) to control the steepness of the curve. In various embodiments, a squashing function may be represented by a number of equations including, but not limited to, the following equations, $$f(x, \beta) = \frac{x}{x + \beta},$$

$$f(x, \beta) = \frac{e^{\frac{x}{\beta}} - 1}{e^{\frac{x}{\beta}} + 1},$$

and $$f(x, \beta) = 1 - e^{-\left|\frac{x}{\beta}\right|},$$

with x as the positive real number and $\beta$ as the control parameter.

Figure 2:
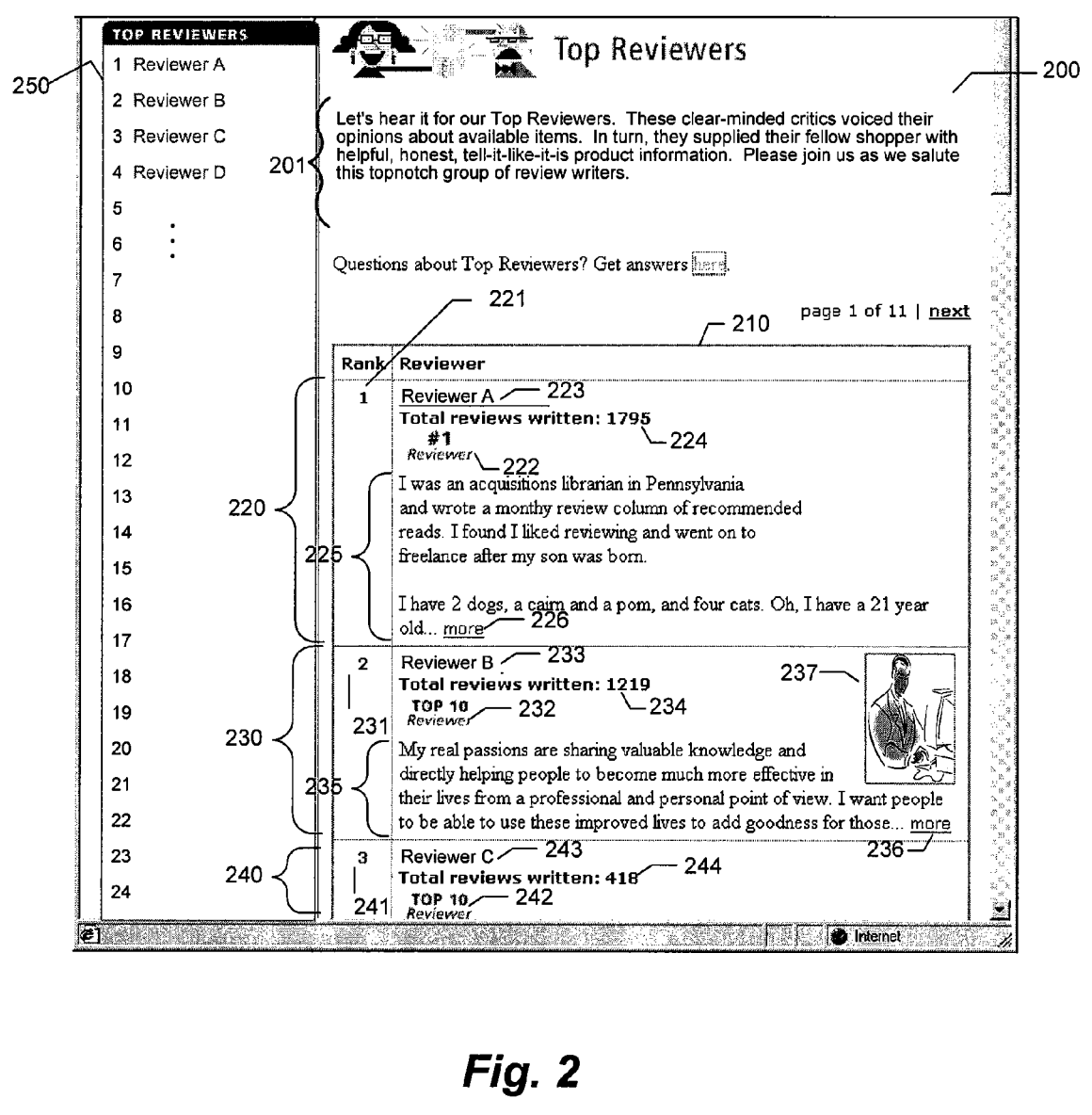

As can be seen from the foregoing illustrated example embodiment, a user contribution rating for a content-providing user, such as a provider of product reviews, may be generated by applying a curve to a combination of multiple factors (e.g., an assessed quality of the content provided by a content-providing user, a quantity of the content provided, a recency of the content provided, etc.), such as illustrated with respect to equation s. In some embodiments, such user contribution ratings may further be used to determine a ranking of content-providing users, such as, for example, a ranking indicative of top-rated content-providing users who provide reviews of products (e.g., top reviewers such as illustrated in FIGS. 2 and 5, etc.).

The foregoing illustrated example embodiment of generating a user contribution rating has been described with respect to specific equations, factors, content types, and methods of assessing quality of content. However, it will be appreciated that other embodiments may be provided. For example, although the foregoing illustrated example generated user contribution ratings based on factors that included quantity of supplied item review contributions, quality of contributions, quantity of evaluators, and the effects of time on contributions by reviewers and evaluators (e.g., age-decay, contribution rating window), other factors may be used in addition to or instead of one or more of the described factors in other embodiments.

In addition, although the foregoing illustrated example included several specific equations, it will be appreciated that the equations are provided for illustrative purposes. In other embodiments, other equations may be provided in addition to or instead of the above-provided equations to generate user contribution ratings. For example, one or more other equations may be provided to control various characteristics of user contribution ratings, such as, for example, characteristics related to how contribution ratings are affected by quantity of contributions, quality of contributions, rate of contributions, a passage of time, etc. As one example, in some embodiments, one or more other equations may be provided such that user contribution ratings may be more or less influenced by a content-providing user's quantity of contributions relative to an assessed quality of the contributions, or vice-versa. In other embodiments, one or more other equations may be provided such that a user contribution rating may be more or less sensitive to a passage of time, such that a user contribution rating degrades more or less rapidly during a period of inactivity by a content-providing user. In addition, although the foregoing example equations have been described with respect to one or more specific variables, values, value ranges, and number types (e.g., real numbers), etc., other embodiments may include equations that use and/or result in other variables, values, value ranges, and number types (e.g., integers, etc.), etc.

In the foregoing illustrated embodiment, user contribution ratings have been described as being determined with respect to a given window of time (e.g., a contribution rating window) during which a content-providing user provided content and/or an evaluator user provided assessments of one or more pieces of content provided by the content-providing user. In some embodiments, a window of time may be specified as a number of years, months, days, weeks, hours, etc. prior to the time that the contribution rating is generated, such that the user is rated based on the content provided by the user during that time and/or evaluations received during that time. In other embodiments, a window of time may be defined as having distinct start and end times, such as to generate one or more historical contribution ratings of users during a distinct time window spanning the start time to the end time (e.g., such as contribution ratings for users that contributed content during one or more distinct weeks, months, years, decades, etc.). In some embodiments, if a user did not provide content during the specified window of time, the user may not qualify to receive a user contribution rating and/or may receive a user contribution rating indicating that the user has not contributed content during the time window (e.g., a minimal user contribution rating, such as 0 in some embodiments and/or a default value). In some embodiments, user contribution ratings may be generated for content-providing users without consideration of any specified window of time in which a user has provided content and/or an evaluator has provided an assessment of a user's content, such as in embodiments where any content provided by a content-providing user may be considered for the determination of the user's contribution rating regardless of when the content was provided by the user and/or evaluated.

In addition, although the foregoing example embodiment has been illustrated with respect to content-providing users who provide item reviews, user contribution ratings may be determined based on additional and/or other types of content pieces provided by content-providing users in various embodiments. For example, in some embodiments, similar to the one described above, user contribution ratings may be generated to reflect a rating based on any types of product reviews, service reviews and other item reviews provided by content-providing users (e.g., so as to rate a reviewer across all categories of items), and in such embodiments, only such item reviews provided by the content-providing users and assessments thereof may be considered to determine a user contribution rating. In other embodiments, user contribution ratings of reviewers may instead be generated to reflect ratings based on reviews of one or more specific item categories (e.g., movies, books, electronics, etc.), such that, for example, content-providing users may be rated with respect to reviews for the one or more specific categories (e.g., movie reviews, book reviews, electronic reviews, clothing reviews, restaurant reviews, club reviews, etc.). In other such embodiments, user contribution ratings of reviewers may be generated based on one or more specified genres and/or other subject matter of items (e.g., non-fiction, literature, science fiction, romance, fantasy, regional, etc.). In still other embodiments, user contribution ratings may be based on one or more of other types of user-provided content, such as content including user-provided commentary on various topics (e.g., other than item reviews), images, videos, news items, short stories, poems, recipes, course work, dissertations, computer code, etc., and in some such embodiments, only one or more of the other types of content may be considered to generate a user contribution rating of a user. In other embodiments, all types or a subset of types of all content pieces provided by a content-providing user may be used to assess a user contribution rating, and in some such embodiments, content pieces of different types may be treated equally in determining user contribution ratings, while in other such embodiments, content pieces of different types may be given different weights depending on the type (e.g., an item review may be weighted more than an image, etc.).

In addition, in other embodiments, quality of one or more content pieces provided by a content-providing user may be determined in various ways in various embodiments. For example, in some embodiments, a quality may be based on an aggregate of at least some evaluations of at least some of the content pieces provided by a content-providing user, such as an average of the evaluations and/or other aggregate assessment. As one example, in some embodiments, a quality of one or more pieces of content may be determined using an equation similar to those provided above with respect to the illustrated example of the assessed aggregate quality of a reviewer's reviews $\overline{O}$. In other embodiments, quality of a content piece may be based on an aggregate of multiple content quality ratings for that content piece, such as when each content quality rating is associated with a particular content piece. In some such cases, the content quality rating for a content piece may be determined based on one or more evaluations of the content piece (e.g., evaluations submitted by evaluator users and/or automated evaluations). It will be appreciated that quality of content pieces may be determined in other ways in other embodiments, and may include one or more other factors suitable for determining quality, such as discussed elsewhere with respect to quality of content. In addition, in various embodiments, a user contribution rating for a user may be based on one or more of various attributes of interest of content pieces provided by content-providing users. For example, in some embodiments, a content-providing user may be rated based on other assessed dimensions of a user's content contributions, in addition to or instead of helpfulness, such as, for example, humor, beauty, fashionability, verisimilitude, etc., and/or a combination of multiple rating dimensions or other attributes. In addition, as previously noted, quality of pieces of content may be based on assessments by evaluator users who provide evaluations of one or more attributes of the content pieces, while in other embodiments, content pieces may be assessed, at least in part, by using automated techniques to evaluate one or more attributes of the content pieces, such as spell-checking, grammar-checking, natural language processing, image analysis and/or other automated techniques.

Figure 7:
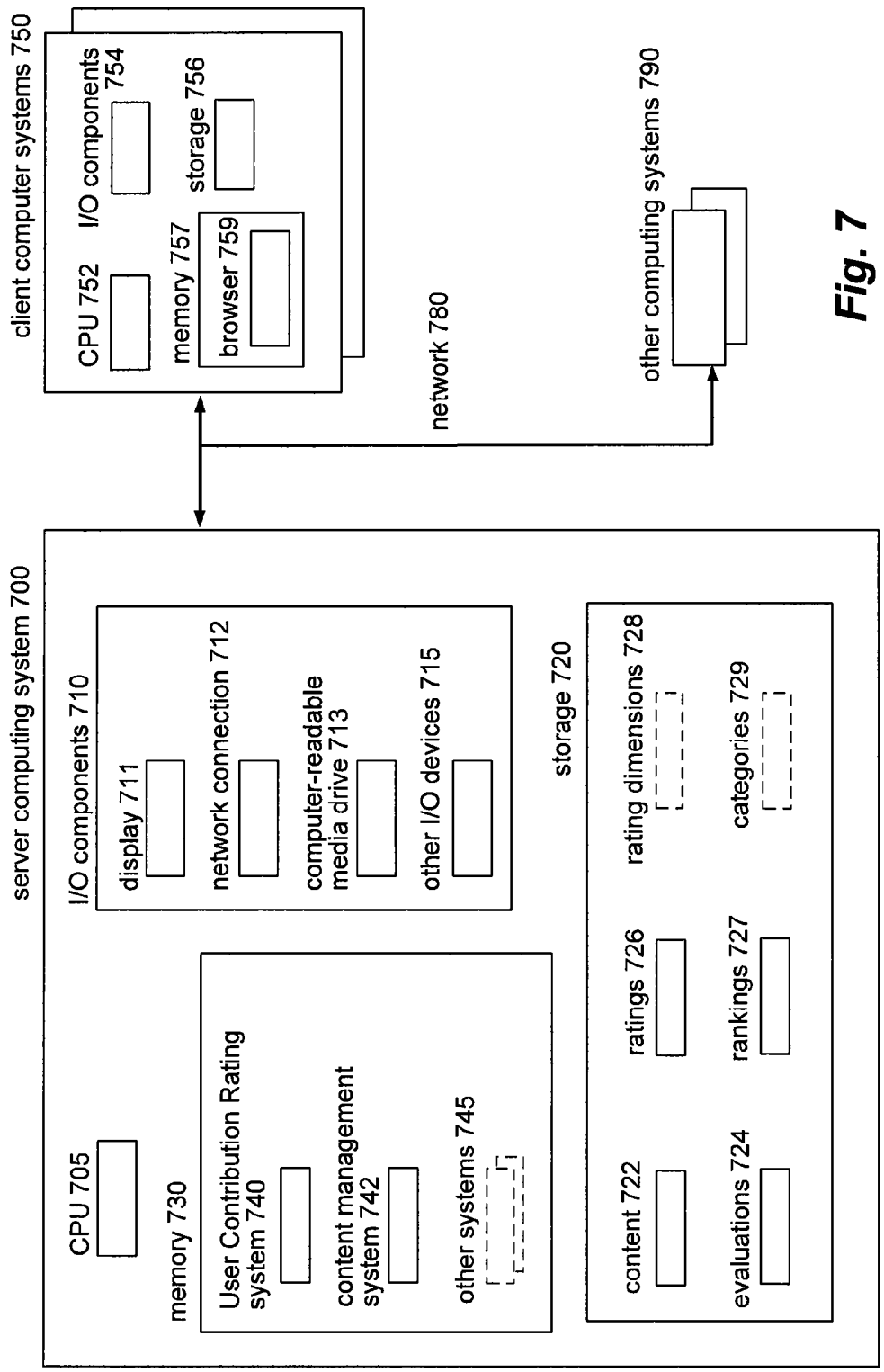
FIG. 7 is a block diagram illustrating an embodiment of a computing system for performing techniques to automatically assess contribution ratings for users based on content provided by the users.

FIG. 7 is a block diagram illustrating an example computing system suitable for performing techniques to automatically assess user contribution ratings for users based on content provided by those users. In particular, FIG. 7 illustrates an example server computing system 700 suitable for assessing user contribution ratings for users, as well as various example client computing systems 750 and other computing systems 790. In the illustrated embodiment, the server computing system 700 has components that include a CPU 705, various input/output ("I/O") components 710, storage 720, and memory 730, with the I/O components illustrated in this example embodiment including a display 711, a network connection 712, a computer-readable media drive 713, and various other I/O devices 715 (e.g., a keyboard, mouse, speakers, etc.). In addition, each of the client computing systems 750 has components that include a CPU 752, various I/O components 754, storage 756, and memory 757. The I/O components 754 may include components similar to those described with respect to the computing system 700.

In the illustrated embodiment, embodiments of a User Contribution Rating ("UCR") system 740 and a content management system 742 are each executing in memory 730, although in other embodiments the systems 740 and 742 may each execute on distinct computing systems, or a single software system may provide functionality of both systems. The UCR system 740 assesses user contribution ratings of content-providing users based on multiple factors related to one or more pieces of content submitted by the content-providing users, as discussed in greater detail elsewhere.

The content management system 742 receives content pieces submitted by content-providing users via network 780, such as from one or more content-providing users interacting with a client computer system 750. For example, in some embodiments, a content-providing user may submit content pieces by interacting with a Web page similar to that of FIG. 6 provided by a browser 759 executing in memory 757. After a content piece is received by the content management system, the content management system may store the content piece and/or information associated with the content piece (e.g., time created, content-providing user identifier, content piece identifier, relationship to other content, one or more categories associated with the content piece, etc.) in storage 720, such as with content information 722.

In addition, the illustrated content management system 742 may also provide received content pieces to one or more users, such as for display to the users and/or to obtain evaluations of the content pieces from the one or more users. For example, in some embodiments, one or more users may interact with one or more of the client computer systems 750 to obtain content pieces from the content management system 742, such as for display in browser 759 in a manner similar to that of FIGS. 3-5. In some embodiments, the content management system may provide to the one or more users information and/or interactive features related to evaluating the content pieces (e.g., such as information and/or features related to optional rating dimensions 728), so that the one or more users may assess various attributes of interest of the content pieces, such as by interacting with a Web page similar to that of FIG. 4 to indicate one or more assessments of the content based on one or more rating dimensions (e.g., helpfulness, humor, etc.), and may obtain such evaluations from the users. In this embodiment, the obtained evaluations may be stored in storage 720 (e.g., as part of evaluations information 724) along with information associated with the obtained evaluations (e.g., time submitted, identifier of evaluated content, evaluator user identifier, etc.).

Additionally, the content management system 742 may also provide to one or more users information related to one or more generated user contribution ratings and/or rankings, such as information from ratings information 726 and rankings information 727. In various embodiments, such information may be provided to one or more users who are operating client computer systems 750 in various manners, such as, for example, to display to the users in one or more manners similar to Web pages described with respect to FIGS. 2-6.

In other embodiments, rather than interact directly with an embodiment of the content management system 742, users of client computer systems 750 may interact with one or more Web servers and/or other software provided by the server computing system 700 that operate in a coordinated manner with the content management system 742 to exchange information, such as one or more optional other systems 745 executing in memory 730. In other embodiments, one or more other computing systems 790 may execute Web servers and/or or other provided software to receive content pieces from content-providing users, and in such cases, the one or more other computing systems 790 may operate in a coordinated manner with the server computing system 700 such that the content pieces may be provided to the content management system 742 (e.g., such as via Web services and/or other programmatic interfaces). In some such embodiments, the one or more other computing systems 790 may be operated by the same entity that operates the server computing system 700 and/or by other entities. Similarly, in some embodiments, the one or more other computing systems 790 may interact with content management system 742 to obtain information related to submitted content pieces (e.g., the content pieces and/or other associated information) and/or information related to ratings/rankings of one or more content-providing users, such as to provide such information to one or more users and/or entities. In still other embodiments, the content management system may be incorporated into one or more other computing systems 790.

In the illustrated embodiment, the UCR system 740 receives indications to assess one or more user contribution ratings for one or more content-providing users (e.g., such as from a merchant or other entity executing an embodiment of the content management system 742 and/or other software system operating in conjunction with the UCR system 740, or instead as initiated by the UCR system on a periodic or other basis), and assesses one or more user contribution ratings for each of the users if possible. In particular, the UCR system may generate one or more user contribution ratings for each of one or more content-providing users based on multiple factors related to a number of content pieces provided by the user, as described in greater detail elsewhere. In the illustrated embodiment, a generated user contribution rating may be stored in storage 720 (e.g., as part of ratings 726). The illustrated UCR system 740 may also rank content-providing users with respect to other content-providing users according to one or more generated user contribution ratings, and such rankings may be stored in storage 720 (e.g., as part of rankings 727). The UCR system may further provide indications of some or all of the assessed ratings and/or rankings to a merchant or other entity, so that the ratings and/or rankings may be used in various ways. In other embodiments, the optional other systems 745 may include a contribution rating manager system that instead performs various actions with respect to the user contribution ratings and/or rankings generated by the UCR system, such as for the contribution rating manager system to generate user rankings based on the user contribution ratings generated by the UCR system, and/or for the contribution rating manager system to generate "leader boards" or other lists of top-ranked and/or top-rated users and to provide the information about the generated rankings and/or lists to other users and systems. In addition, in other embodiments, the optional other systems 745 may include a content quality rating system that instead performs various actions with respect to assessing quality and/or other attributes of at least some of the content pieces provided by the content-providing users—in such embodiments, the UCR system may optionally use assessed content ratings from the content quality rating system for supplied content pieces when assessing a user contribution rating for a content-providing user who provided those supplied content pieces.

In some embodiments, the UCR system may assess user contribution ratings and/or rankings at times and/or in manners other than upon request, such as periodically or when additional information related to such assessments becomes available. In addition, in some embodiments the UCR system may further assign default ratings (e.g., a rating of zero) to new users or others who do not have sufficient information (e.g., sufficient content piece contributions and/or evaluations) to assess a rating and/or ranking. Furthermore, in some embodiments, the UCR system 740 may generate one or more user contribution ratings based on one or more assessed attributes of interest of content pieces provided by the user, such as attributes related to rating dimensions stored in optional rating dimensions information 728. In addition, in some embodiments the UCR system may further assess multiple user contribution ratings for each of at least some of the users, such as to reflect different categories of provided content pieces and/or to reflect other types of information, as may be defined in the optional categories information 729 (or other similar information stores, not shown) on storage 720.

As previously noted, a Web server may be provided by the server computing system 700 and/or other computing systems 790 in some embodiments, such that users of client computing systems 750 may request information from and/or provide information to the Web server by using Web browsers 759 executing in memory 757 of the computing systems 750. In such embodiments, the Web server may respond with appropriate information to be displayed or otherwise presented to the users, such as on display devices (not shown) of the I/O components 754 of the computing systems 750. For example, in some situations, a Web server may be used by a Web merchant to provide shopping-related functionality to users who are customers of the merchant, such as to provide information about available products. In some embodiments, the Web server may interact with the content management system 742 to select appropriate user-supplied content pieces to provide to users, such as in conjunction with other content provided by the merchant and/or content management system. Similarly, the Web server may obtain information related to user contribution ratings and/or rankings to include along with other information provided to users. In addition, when new pieces of content are supplied by content-providing users to the Web server, the Web server may interact with the content management system 742 or other component (not shown) to store the submitted content piece. In some embodiments, the Web server may facilitate obtaining user contribution ratings and/or rankings such as by interacting with the content management system and/or UCR system to indicate that such ratings/rankings should be generated. In addition, while in some embodiments the UCR and/or content management systems are operated as part of an organization with one or more Web servers in order to support the one or more Web sites provided by those Web servers for the organization, in other embodiments one or both of the systems may also or instead interact with various external third-party computer systems, such as to provide assessment-based functionality to them as a service (e.g., as a Web service) and/or to exchange assessment-related information with them.

It will be appreciated that computing systems 700, 750 and 790 are merely illustrative and are not intended to limit the scope of the present disclosure. For example, computing system 700 may instead be comprised of multiple interacting computing systems or devices, and may be connected to other devices that are not illustrated, including through one or more networks such as the Internet or via the World Wide Web ("Web"). In addition, storage or other components illustrated as being on one computing system may instead be present on one or more other computing systems or network devices, such as to use one or more network storage devices in place of or in addition to local storage. More generally, a "client" or "server" computing system or device may comprise any combination of hardware or software that can interact in the manners described, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes, DVRs, etc.), and various other consumer products that include appropriate inter-communication and computing capabilities. In addition, the functionality provided by the illustrated systems may in some embodiments be combined in fewer systems or distributed in additional systems. Similarly, in some embodiments the functionality of some of the illustrated systems may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 8:
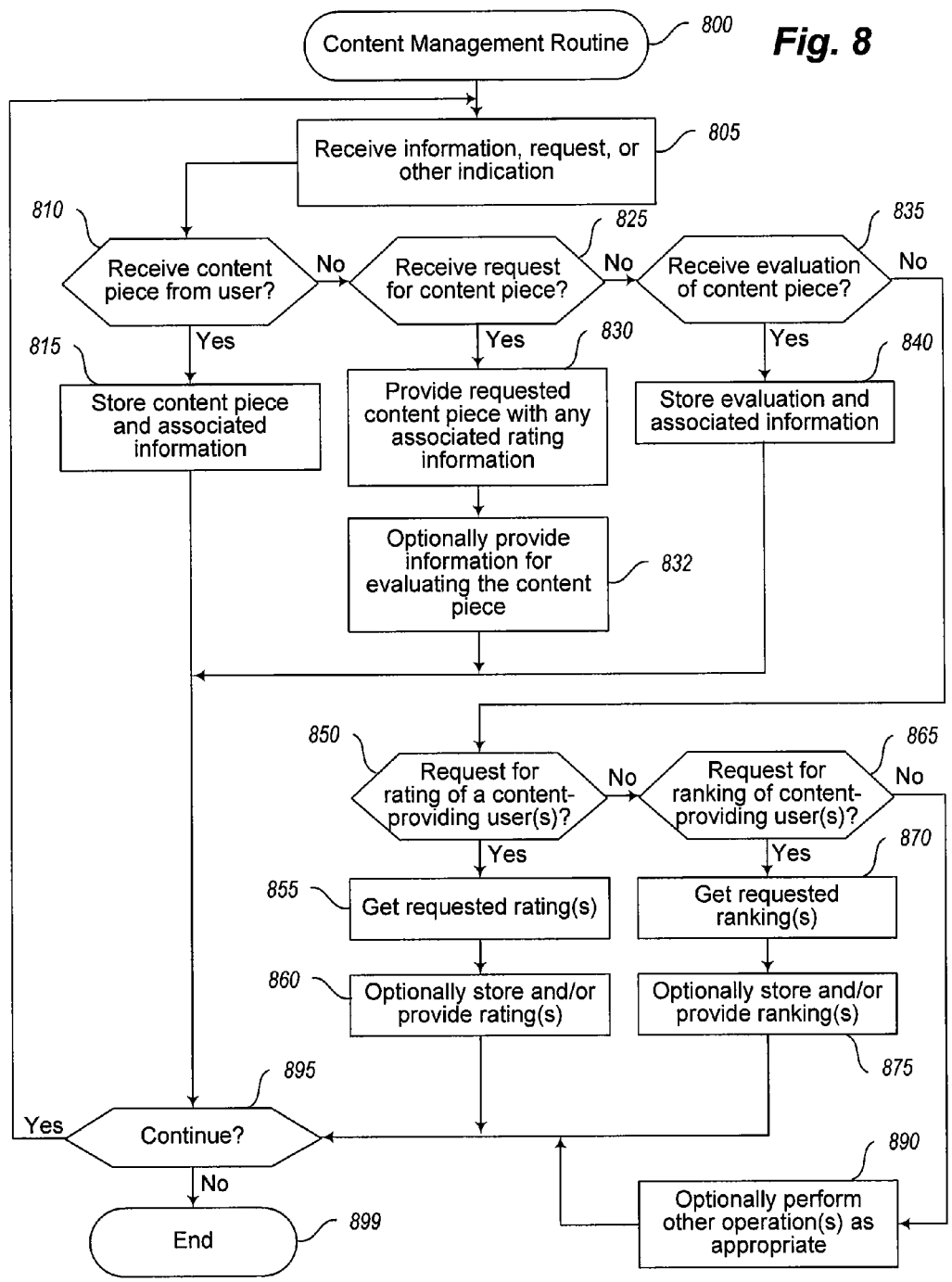
FIG. 8 is a flow diagram of an example embodiment of a Content Management routine.

FIG. 8 is a flow diagram of an example embodiment of a Content Management routine 800. The routine may, for example, be provided by execution of an embodiment of the content management system 742 of FIG. 7 and/or the content management system 146 of FIG. 1, such as to, in this illustrated embodiment, manage information with respect to content pieces provided by one or more content-providing users.

The illustrated embodiment of the routine begins at block 805, where information, a request, or another indication is received. The routine continues to block 810 to determine whether an indication of a content piece has been received from a content-providing user, and if so continues to block 815 to store the content piece and any associated information (e.g., time received/created, content-providing user identifier, related content, etc.) for later use. In various embodiments, the routine may perform one or more various other operations upon receiving a content piece, such as filtering the content piece for appropriateness; notifying one or more systems, processes, routines, users and/or entities that a content piece has been received (e.g., such as for purposes of compensating and/or rewarding a content-providing user, such as to further process the received content piece, etc.); provide information to the content provider who provided the piece (e.g., confirmation message, an award, etc.); etc.

If it is instead determined in block 810 that an indication of a content piece was not received, the routine continues to block 825 to determine whether an indication of a request for a content piece has been received. If so, the routine continues to block 830 to provide the requested content piece, along with any associated user contribution rating information as appropriate in at least some situations. For example, in some embodiments, one or more indications related to one or more generated user contribution ratings of a user who provided the content piece may be provided along with the information, such as one or more user contribution ratings generated for the user by an embodiment of the User Contribution Rating routine 900 discussed below with respect to FIG. 9. In some embodiments, such indications may include indications of the user's rating, an award and/or title given to the user based on one or more of the ratings, a display badge or other icon for top-rated and/or top-ranked content-provided users, etc. After block 830, the routine continues to block 832 to optionally provide additional information related to enabling the receiving user to evaluate a content piece, such as information related to one or more attributes of interest (e.g., rating dimensions such as helpfulness, humor, etc.) of the content piece to be assessed by an evaluator user and associated user-selectable controls, and such as in situations when the potential evaluator user is not the content-providing user who supplied the content piece and has not already evaluated the content piece.

If it is instead determined in 825 that an indication of a request for a content piece was not received, the routine continues to block 835 to determine whether an indication of an evaluation of a content piece has been received, and if so continues to block 840. For example, in some embodiments, the routine may receive one or more evaluations of a content piece, such as evaluations based on one or more assessed attributes of interest related to the content piece (e.g., helpfulness, humor, etc.). In some embodiments, such evaluations may have been performed by one or more evaluator users who assessed one or more attributes of interest related to the content piece, such as one or more evaluator users who received optional information related to evaluating a content piece (e.g., in block 832) and provided an evaluation based on the received information. In some embodiments, at least some of the received evaluations may have been performed at least in part by an automated method (e.g., natural language processing, image analysis, etc.). In block 840, the received evaluation may be stored for later use along with any associated information as appropriate (e.g., time received/evaluated, evaluator identifier, related content piece identifier, evaluation method, etc.).

If it was instead determined in 835 that an indication of an evaluation of a content piece is not received, the routine continues to block 850 to determine whether an indication of a request for user contribution ratings of one or more content-providing users has been received, and if so continues to block 855. In some embodiments, such a request may include indications of one or more particular content-providing users for which ratings are to be retrieved and/or indications of one or more other identifiable characteristic of a content-providing user (e.g., all content-providing users, a number of top-rated reviewers, etc.). In addition, in some embodiments, such requests may include an indication of one or more specific ratings criteria with respect to the requested user contribution ratings, such as, for example, content categories, rating dimensions, contribution rating window, etc., such that the requested ratings may be related to and/or based on the indicated criteria. In block 855, the routine obtains the requested user contribution ratings, such as by interacting with an embodiment of the User Contribution Rating routine 900 of FIG. 9 (discussed below) or by obtaining stored ratings from a database and/or other storage means. In block 860, after the routine obtains the requested ratings, the routine may optionally store the ratings for later use (e.g., if the obtained ratings were not already stored, and to enable them to later be provided to other requesters), and/or provides the requested user contribution ratings to the requester.

If at block 850, it is instead determined that an indication of a request for one or more user contribution ratings was not received, the routine continues to block 865 to determine whether an indication of a request for one or more rankings of one or more content-providing users is received, such as rankings based in part on one or more generated user contribution ratings of the content-providing users. If so, the routine continues to block 870 to obtain the requested rankings, such as by interacting with an embodiment of the User Contribution Rating routine 900 of FIG. 9 (discussed below) and/or by retrieving them from storage. In some embodiments, the request for rankings may include indications of one or more rankings criteria, such as criteria similar to the ratings criteria discussed with respect to block 850. In block 875, after the routine obtains the requested rankings, the routine may optionally store and/or provide the requested rankings to the requester.

If it was instead determined in block 865 that an indication of a request for one or more rankings was not received, the routine continues to block 890 to optionally perform one or more indicated operations as appropriate. After blocks 815, 832, 840, 860, 875 and 890, the routine continues to block 895 to determine whether to continue, such as until an explicit indication to terminate is received. If so, the routine returns to block 805, and otherwise the routine continues to 899 and ends.

Figure 9:
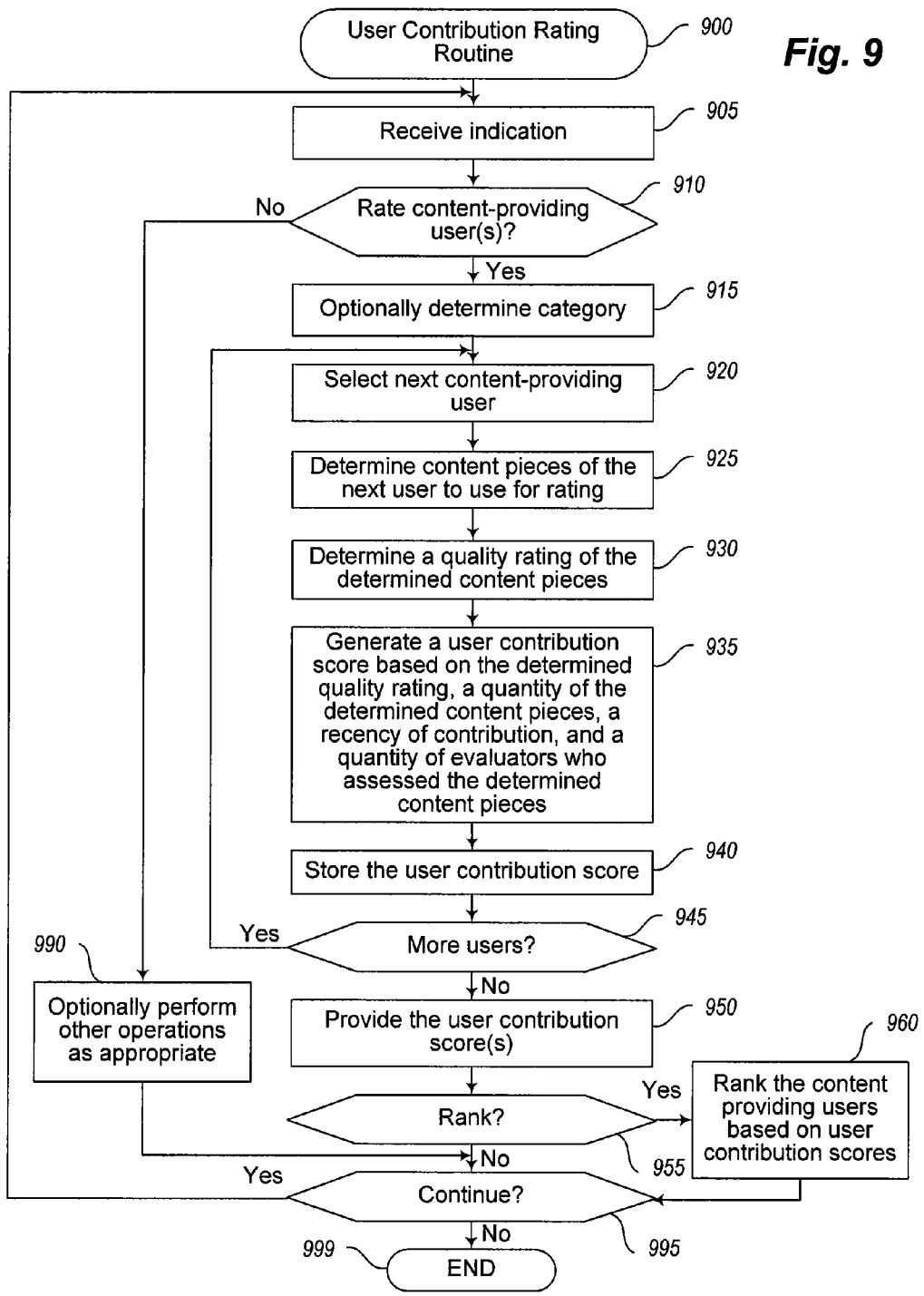
FIG. 9 is a flow diagram of an example embodiment of a User Contribution Rating routine.

FIG. 9 is a flow diagram of an example embodiment of a User Contribution Rating routine 900. The routine may, for example, be provided by execution of an embodiment of the User Contribution Rating System 740 of FIG. 7 and/or the user contribution rating system 142 of FIG. 1, such as to, in this illustrated embodiment, assess user contribution ratings of content-providing users. While user contribution ratings and/or rankings are generated and stored for later use in this illustrated embodiment, other embodiments may be invoked dynamically to provide current assessments of user contribution ratings and/or rankings upon request, such as based on whatever relevant information is available at that time.

The illustrated embodiment of the routine begins at block 905, where an indication is received of a request or instruction. The routine continues to block 910 to determine whether the received indication includes a request to rate one or more content-providing users, and if so continues to block 915 to optionally determine one or more content categories of interest with respect to the requested user contribution rating (e.g., based on an indication of one or more categories received with the request) and/or other user contribution rating type information of interest. As discussed elsewhere, in some embodiments, user contribution ratings of multiple types may be generated based on corresponding subsets of relevant information.

After block 915, the routine continues to block 920 to select a next content-providing user to be rated, beginning with a first such user from a group of one or more candidate users. The routine may select the next content-providing user in various ways in various embodiments. For example, in some embodiments, a request to rate one or more content-providing users may include an indication of the one or more content-providing users to be rated, and in such embodiments the next user is selected from the indicated one or more users. In some embodiments, the routine may automatically determine who the next content-providing user is from the determined group of candidate users (e.g., such as all users who have provided content), and select a next user as appropriate. In addition, in some embodiments, the selection of a next user may be based on verifying that the selected user qualifies to be rated, such as with respect to specified rating criteria (e.g., such as users who submitted content pieces related to an indicated category, such as a category determined in block 915; who submitted content pieces within an indicated window of time; who submitted content pieces that have been assessed with respect to one or more indicated attributes of interest; etc.). In other embodiments, the routine may determine whether a content-providing user qualifies based on other criteria, such as whether the user has provided a minimum amount of content and/or whether the user's content has been sufficiently evaluated (e.g., such as by one or more evaluator users), etc.

In block 925, the routine determines which content pieces submitted by the content-providing user to use in generating a user contribution rating for the user. In some embodiments, a user contribution rating may be determined based on all content pieces provided by the content-providing user, while in other embodiments a subset of the content pieces provided by the content-providing user is used (e.g., based on content categories, attributes of interest, a time frame of submission, etc.).

In block 930, the routine then determines a quality rating of the determined content pieces, such as a single assessed aggregate quality rating for the determined content pieces. Such a quality rating may be determined in various ways in various embodiments, as discussed elsewhere. In other embodiments, a content quality rating for each of the determined content pieces may be determined (e.g., either by the routine 900 and/or another routine), and one or more of the determined content quality ratings may be used to determine the quality rating of the determined content pieces (e.g., such as by aggregating the determined content quality ratings). In addition, in some embodiments, the one or more evaluations used to determine the quality rating of the content pieces may be selected for use in the determination in various ways in various embodiments. For example, in some embodiments, one or more of the evaluations may be selected based in part on when one or more of the evaluations was received from an evaluator user (e.g., only evaluations received within a specified period of time), while in other such embodiments, only evaluations by evaluator users who have recently provided an evaluation may be selected. In other embodiments, the determining of the assessed aggregate quality rating and/or multiple individual quality ratings for the determined content pieces may be performed by another system, such as a content quality rating system, and obtained by the routine 900 in block 930 by interacting with that other system.

The routine then continues to block 935, where at least one user contribution score or other rating is generated for the selected content-providing user based at least in part on the determined quality rating from block 930, a quantity of the determined content pieces of block 925, a recency of when one or more of the determined content pieces were submitted by the selected content-providing user being assessed, and a quantity of evaluator users who have evaluated the determined content pieces. In other embodiments, a user contribution score may be generated in other manners, as discussed elsewhere. After block 935, the routine continues to block 940 to store the generated user contribution score(s) for later use. After block 940, the routine continues to block 945 to determine whether there are more users to be assessed. If so, the routine returns to block 920 to select a next user, and if not the routine continues to block 950 to provide indications of the one or more determined user contribution scores to the requester. In other embodiments, if the rating of the content-providing user(s) was instead initiated by the routine 900 (e.g., periodically), the providing of block 950 may not be performed.

In block 955, the routine next determines whether the indication received in block 905 includes a request to rank one or more content-providing users relative to other content-providing users based on the generated user contribution scores, or whether such ranking is to be performed for other reasons (e.g., if the routine automatically maintains updated rankings whenever ratings are generated, if the rankings are performed periodically, etc.). If so, the routine continues to block 960 to rank the content-providing users accordingly, and optionally to store the rankings for later use and/or to provide the rankings to the requester in a manner similar to that previously discussed with respect to blocks 940 and 950. In some embodiments, multiple rankings may be performed, such as if one or more of the content-providing users have been rated with respect to multiple different rating factors. In other embodiments, the generating of the rankings and/or other use of generated rankings may be performed by another system, such as a contribution rating manager system, and obtained by the routine 900 in block 960 by interacting with that other system.

If instead at block 910 it was not determined to rate one or more content-providing users, the routine continues to block 990 to perform one or more other indicated operations as appropriate. After blocks 990 and 960, or if it is instead determined at block 955 not to rank one or more content-providing users, the routine continues to block 995 to determine whether to continue, such as until an explicit indication to terminate is received. If so, the routine returns to block 905, and otherwise the routine continues to block 999 and ends. While not illustrated here, in other embodiments the routine could further optionally provide one or more award indications to content-providing users based on newly calculated ratings and/or rankings for the users, such as to display indications of their new rank, of one or more of their new ratings, of changes in their overall rank and/or ratings over time, to provide a monetary or monetary equivalent adjustment to the user based on one or more of their new ratings and/or rankings, etc.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other embodiments the operations may be performed in other orders and in other manners. Any data structures discussed above may also be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system of an online merchant to assess users who provide content to the online merchant, the method comprising:

receiving multiple pieces of content that are created by multiple author users and that are supplied to the online merchant for use by customers of the online merchant, the pieces of content each being a user-generated item review for one of multiple items available from the online merchant and at least some of the author users being a subset of the customers of the online merchant, each of the multiple author users creating one or more of the multiple item review content pieces;

assessing the multiple item review content pieces by,
receiving multiple evaluations of the multiple item review content pieces from multiple evaluator users who are customers of the online merchant, each of the received evaluations being from one of the evaluator users for one of the item review content pieces and including a numerical rating of the item review content piece for each of one or more of multiple pre-defined rating dimensions, each rating dimension related to an aspect of the item review content piece such that a numerical rating for the rating dimension indicates an assessment by the evaluator user of a degree to which that aspect of the item review content piece is satisfied, the received evaluations including one or more evaluations for each of the multiple item review content pieces; and automatically determining a quality rating for each of the multiple item review content pieces and for each of at least one of the multiple rating dimensions based on the numerical ratings of the one or more received evaluations for the item review content piece;

for each of at least some of the multiple author users, automatically generating an author contribution score for the author user based at least in part on the one or more item review content pieces created by the author user, the generated author contribution score for the author user being based on a quantity of the one or more item review content pieces created by the author user, on the automatically determined quality ratings for the one or more item review content pieces created by the author user, on a recency that the author user supplied the one or more content pieces created by the author user, on a quantity of one or more of the evaluator users who supplied evaluations of the one or more item review content pieces created by the author user, and on a recency that the one or more evaluator users supplied evaluations of the one or more item review content pieces, the automatically generating the author contribution score being performed by one or more configured computing systems; and providing one or more indications of at least some of the generated author contribution scores.

2. The method of claim 1 further comprising:

receiving multiple requests from the customers of the online merchant for information regarding the multiple items available from the online merchant, each of the requests being received from one of the customers and corresponding to one or more of the multiple available items; and responding to each of the multiple requests by selecting one or more of the item review content pieces that include item reviews for at least one of the one or more items to which the request corresponds and by providing the selected one or more item review content pieces to the customer from whom the request was received, the selecting of the one or more item review content pieces being based at least in part on the generated author contribution scores of the author users who created the one or more item review content pieces.

3. The method of claim 1 further comprising generating rankings of the author users relative to other of the author users based at least in part on the generated author contribution scores for the at least some author users, and wherein the providing of the one or more indications of the at least some generated author contribution scores includes providing information to at least some of the customers of the online merchant about the generated relative rankings of the author users.

4. A computer-implemented method for assessing users who provide content, the method comprising:

receiving a plurality of supplied pieces of content that are created by a plurality of author users and that are supplied for use by other users, such that each of the plurality of author users create one or more of the plurality of content pieces;

receiving a plurality of evaluations of the supplied content pieces from a plurality of evaluator users, each of the received evaluations being from one of the evaluator users for one of the content pieces and including a quantitative assessment of that content piece with respect to an indicated content rating dimension, the received evaluations including one or more evaluations for each of the plurality of content pieces;

for each of at least some of the plurality of author users, automatically determining an aggregate assessment of quality of the one or more content pieces created by the author user, the determined aggregate quality assessment being based at least in part on the received evaluations from the plurality of evaluator users for the one or more content pieces created by the author user; and automatically generating an author contribution score for the author user based at least in part on multiple of a quantity of the one or more content pieces created by the author user, of the automatically determined aggregate quality assessment for the one or more content pieces created by the author user, of a recency that the one or more content pieces created by the author user are supplied, and of a quantity of the evaluator users who supplied evaluations for the one or more content pieces created by the author user, the automatically generating the author contribution score being performed by one or more programmed computing systems; and providing an indication of at least one of the generated author contribution scores.

5. The method of claim 4 further comprising generating rankings of multiple of the plurality of author users relative to other of the plurality of author users based at least in part on the generated author contribution scores for the at least some author users, and wherein the providing of the indication of the at least one generated author contribution scores includes providing information about one or more of the generated relative rankings of the multiple author users.

6. The method of claim 5 wherein the method is performed by one or more computing systems of an online merchant, and wherein the providing of the information about the one or more generated relative rankings of the multiple author users includes providing that information to at least some customers of the online merchant.

7. The method of claim 4 further comprising selecting a subset of the supplied content pieces to provide to at least some of the other users based at least in part on generated author contribution scores of the author users who created the content pieces of the subset.

8. The method of claim 4 wherein, for each of the at least some author users, the determining of the aggregate quality assessment of the content pieces created by the author user includes determining, for each evaluator user who evaluates at least one of the content pieces created by the author user, an average content piece assessment of the content pieces created by the author user, and combining the determined average content piece assessments of those evaluator users in such a manner that each of those evaluator users receives equal influence in the determining of the aggregate quality assessment for the author user.

9. The method of claim 4 wherein, for each of the at least some author users, the automatic generating of the author contribution score for the author user is based on all of the quantity of the content pieces created by the author user, the automatically determined aggregate quality assessment for the content pieces created by the author user, the recency that the content pieces created by the author user are supplied, and the quantity of the evaluator users who supplied evaluations for the one or more content pieces created by the author user, wherein the quantity of the content pieces created by the author user and the recency that the content pieces created by the author user are supplied are assessed at least in part by decaying over time a weight of the quantity of the content pieces created by the author user in such a manner that a first quantity of content pieces if supplied at a recent first time is given a larger weight than the same first quantity of content pieces if supplied at a less recent second time, and wherein the quantity of the evaluator users who supplied evaluations is assessed at least in part by decaying over time a weight of the quantity of evaluator users in such a manner that a second quantity of evaluator users who supplied evaluations at a third recent time is given larger weight than the same second quantity of evaluator users who supplied evaluations at a less recent fourth time.

10. The method of claim 4 wherein one or more of the at least some author users each create multiple of the plurality of content pieces, wherein the multiple content pieces of at least one of the one or more author users each receive multiple evaluations in the plurality of received evaluations, and wherein the determining of the aggregate quality assessment of the content pieces created by each of the one or more author users includes determining an individual quality assessment of each of the multiple content pieces created by the author user and determining the aggregate quality assessment for the author user based by combining the determined individual quality assessments of the multiple content pieces created by the author users.

11. The method of claim 4 wherein the method is performed by one or more computing systems of an online merchant that makes items available to customers, and wherein at least some of the supplied content pieces include textual reviews of the available items.

12. The method of claim 4 wherein the method is performed by one or more computing systems of a content provision service that makes content pieces available to users of the content provision service, and wherein at least some of plurality of content pieces each include at least one of a media file, a streaming media clip, instructional information related to one or more topics, and a list of multiple related elements.

13. The method of claim 4 wherein the automatic generating of the author contribution score for each of multiple of the at least some author users includes generating multiple distinct author contribution scores for the author user that correspond to at least one of multiple distinct categories of content, multiple distinct types of content, and multiple distinct types of activities of the author user, and wherein the providing of the indication of the at least one generated author contribution scores includes providing information about generated author contribution scores for multiple author users for at least one of one or more content categories, of one or more content types, and of one or more activity types.

14. The method of claim 4 further comprising receiving multiple additional supplied pieces of content that are created by the plurality of author users and that are supplied for use by the other users, the received additional supplied pieces of content being distinct from the received plurality of supplied content pieces, the received plurality of evaluations not including any evaluations of the multiple additional supplied pieces of content, and wherein the automatically determined aggregate quality assessments for the at least some author users are not based on the multiple additional supplied pieces of content.

15. The method of claim 4 wherein the indicated content rating dimension for each of the received plurality of evaluations is one of multiple predefined content rating dimensions, wherein the indicated content rating dimension for each of at least some of the received plurality of evaluations is based on usefulness of the content piece being evaluated, and wherein, for each of the received plurality of evaluations, the evaluator user who provides the evaluation is distinct from the author user who created the one content piece being evaluated.

16. A non-transitory computer-readable medium whose contents cause a computing device to assess users who provide content, by performing a method comprising:
determining one or more assessments of quality of multiple pieces of content provided by a user, the one or more assessments being based at least in part on one or more rated attributes of at least some of the multiple provided content pieces;
automatically generating a contribution rating for the user based on the multiple provided content pieces, the generated contribution rating being based at least in part on multiple of a quantity of the multiple provided content pieces, of a recency that the multiple provided content pieces are provided by the user, and of at least one of the determined one or more quality assessments of the multiple provided content pieces; and
providing an indication of the generated contribution rating for the user.

17. The non-transitory computer-readable medium of claim 16 wherein the user is an author user who creates at least some of the multiple provided content pieces, wherein the one or more rated attributes of the at least some provided content pieces are based on a plurality of evaluations of the multiple provided content pieces that are received from a plurality of evaluator users, each of the received evaluations including at least one quantitative assessment that rates one or more indicated attributes of at least one of the multiple provided content pieces, wherein the determined one or more quality assessments of the multiple provided content pieces include an aggregate quality assessment for the multiple provided content pieces, and wherein the generated contribution rating for the user is an author contribution score.

18. The non-transitory computer-readable medium of claim 16 wherein the computer-readable medium is at least one of a memory of a computing device and a data transmission medium transmitting a generated data signal containing the contents.

19. The non-transitory computer-readable medium of claim 16 wherein the contents are instructions that when executed cause the computing device to perform the method.

20. A computing system configured to assess users who provide content, comprising:
one or more processors; and
a user contribution rating system configured to, when executed by the one or more processors, assess users who provide content to an on-line merchant by, for each of multiple users who each provide one or more content pieces:
determine an aggregate assessment of quality of one or more content pieces provided by the user based at least in part on received evaluations from a plurality of evaluator users for the one or more content pieces provided by the user; and
generate a contribution rating for the user based at least in part on multiple of a quantity of the one or more content pieces provided by the user, of the determined aggregate quality assessment for the one or more content pieces provided by the user, of a recency that the one or more content pieces provided by the user are supplied, and of a quantity of the evaluator users who supplied evaluations for the one or more content pieces provided by the user; and
provide an indication of the contribution rating for the user.

21. The computing system of claim 20 wherein, for each of at least some of the multiple users, the user provides multiple content pieces and is an author user who creates at least some of the multiple provided content pieces, and each of the received evaluations includes at least one quantitative assessment of one or more indicated attributes of at least one of the multiple provided content pieces.

22. The computing system of claim 20 further comprising a content quality rating system configured to, for each of at least some of the multiple users, perform the determining of the aggregate assessment of quality of one or more content pieces provided by the user.

23. The computing system of claim 20 further comprising a contribution rating manager system configured to, after the providing of the indication of the contribution rating for each of at least some of the multiple users, generating rankings of multiple of the at least some users relative to other users based at least in part on the contribution ratings for the multiple at least some users, and providing one or more indications of the generated rankings.

24. The computing system of claim 20 wherein the user contribution rating system includes software instructions for execution in memory of the computing system.

25. The computing system of claim 20 wherein the user contribution rating system assesses users who provide content by, for each of multiple users who each provide one or more content pieces:
determining a quality rating of at least one of the content pieces provided by the user based at least in part on one or more quality assessments provided by one or more evaluators, each of the provided quality assessments being for at least one of the content pieces provided by the user;
assessing a contribution rating for the user based on multiple of a quantity of the content pieces provided by the user, of a recency that the user provides the one or more content pieces, and of the determined quality rating; and
providing an indication of the assessed contribution rating for the user.

* * * * *